(12) United States Patent
Wach

(10) Patent No.: US 8,494,311 B1
(45) Date of Patent: Jul. 23, 2013

(54) ISOLATING LIGHT PATHS

(71) Applicant: Michael L. Wach, Alpharetta, GA (US)

(72) Inventor: Michael L. Wach, Alpharetta, GA (US)

( * ) Notice: Subject to any disclaimer, the term of this patent is extended or adjusted under 35 U.S.C. 154(b) by 0 days.

(21) Appl. No.: 13/721,526

(22) Filed: Dec. 20, 2012

Related U.S. Application Data

(63) Continuation of application No. 12/589,040, filed on Oct. 17, 2009, now Pat. No. 8,355,605.

(60) Provisional application No. 61/196,421, filed on Oct. 17, 2008.

(51) Int. Cl.
*G02F 1/035* (2006.01)
*G02B 6/26* (2006.01)
*G02B 6/42* (2006.01)
*G02B 6/00* (2006.01)

(52) U.S. Cl.
USPC .................................. 385/3; 385/16; 385/122

(58) Field of Classification Search
None
See application file for complete search history.

(56) References Cited

U.S. PATENT DOCUMENTS

| | | | |
|---|---|---|---|
| 5,748,810 A * | 5/1998 | Schmid | 385/7 |
| 6,298,180 B1 * | 10/2001 | Ho | 385/15 |
| 6,408,111 B1 | 6/2002 | Doerr et al. | |
| 6,473,541 B1 * | 10/2002 | Ho | 385/15 |
| 6,580,534 B2 | 6/2003 | Madsen | |
| 6,788,838 B2 * | 9/2004 | Ho | 385/15 |
| 8,355,605 B1 * | 1/2013 | Wach | 385/16 |
| 2002/0159686 A1 | 10/2002 | Madsen | |
| 2005/0089326 A1 | 4/2005 | Regev et al. | |
| 2010/0111470 A1 * | 5/2010 | Assefa et al. | 385/16 |

OTHER PUBLICATIONS

U.S. Official Action dated May 2, 2012 in U.S. Appl. No. 12/589,040.
U.S. Notice of Allowance dated Oct. 17, 2012 in U.S. Appl. No. 12/589,040.

* cited by examiner

*Primary Examiner* — Rhonda Peace
(74) *Attorney, Agent, or Firm* — Hope Baldauff, LLC

(57) ABSTRACT

Optical waveguides can extend alongside one another in sufficient proximity such that light couples between or among them as crosstalk. The electromagnetic field associated with light flowing in one optical waveguide can extend to an adjacent optical waveguide and induce unwanted light flow. The optical waveguide receiving the crosstalk can comprise a phase shifting capability, such as a longitudinal variation in refractive index, situated between two waveguide lengths. Crosstalk coupled onto the first waveguide length can flow through the refractive index variation, be phase shifted, and then flow onto the second waveguide length. The phase shifted crosstalk flowing on the second waveguide can meet other crosstalk that has coupled directly onto the second waveguide segment. The phase difference between the two crosstalks can suppress crosstalk via destructive interference. Destructive interference can also result from disposing a phase shifting provision in a crosstalk coupling path located between two optical waveguides.

25 Claims, 15 Drawing Sheets

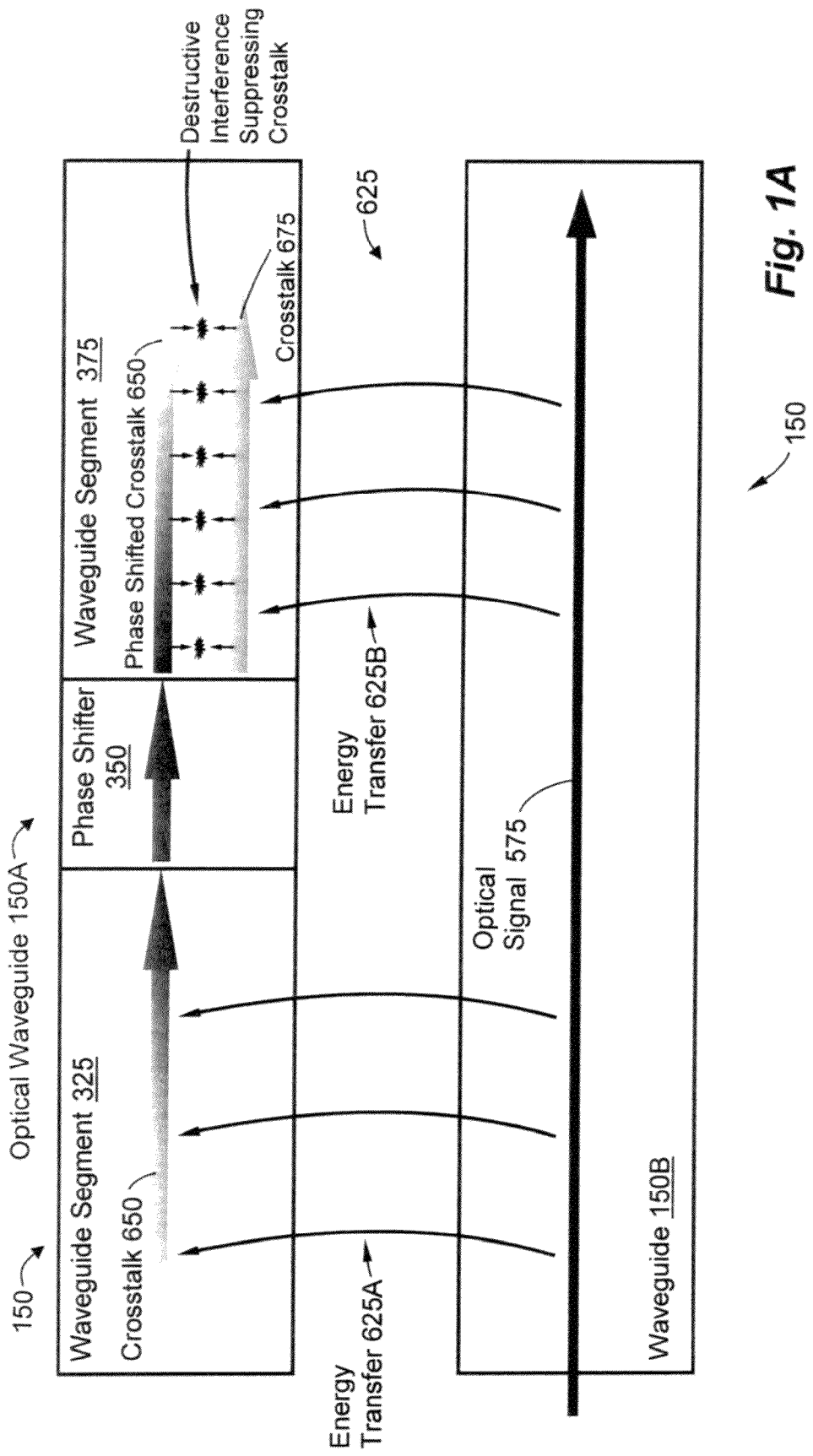

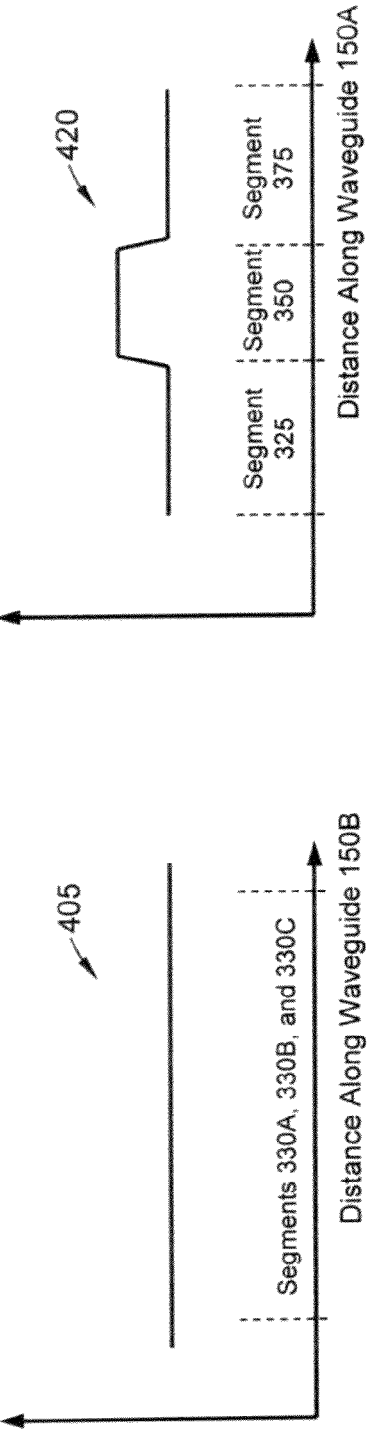
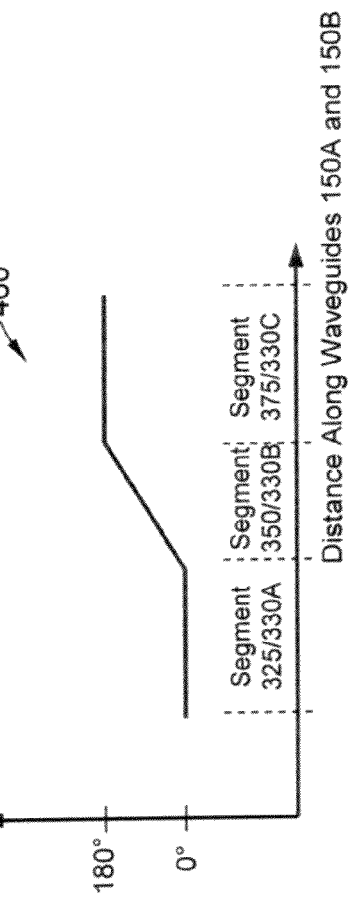

ISOLATING LIGHT PATHS

CROSS REFERENCE TO RELATED APPLICATIONS

This application is a continuation of co-pending U.S. application Ser. No. 12/589,040, now U.S. Pat. No. 8,355,605, filed Oct. 17, 2009 entitled "Isolating Light Paths" which claims the benefit of priority to U.S. Provisional Patent Application No. 61/196,421 filed Oct. 17, 2008, entitled "Isolating Light Paths," the entire contents of both of which are hereby incorporated herein by reference.

FIELD OF THE TECHNOLOGY

The present technology generally relates to transmitting light over adjacent optical waveguides that are isolated from one another, and more particularly to avoiding crosstalk problems via managing the phase of coupled crosstalk so that various crosstalk components destructively interfere with one another.

BACKGROUND

Light propagating over one or more optical waveguides or optical paths can serve multiple purposes, such as transmitting information in the form of optical signals imprinted with digital data or analog information, conveying images, sensing chemicals and physical parameters, conducting energy for powering electrical devices, lasing, clocking computing devices, timing events, controlling processes and systems, and illuminating objects and spaces for visual observation, to mention a few examples. With an interest in making optical, electrical, computing, communications, and optoelectronic systems more compact, design engineers desire to place optical waveguides close together. However, when optical waveguides are disposed near one another, their isolation from one another often suffers. Optical waveguides that are in proximity to one another often have an increased propensity to couple crosstalk between (or among) one another, leading to various problems and issues. The optical crosstalk can obscure optical signals of interest, for example. A detector intended to receive an optical signal on one optical waveguide may instead respond to crosstalk from a different optical signal inadvertently propagating on that waveguide. Accordingly, optical crosstalk can degrade isolation and can impair signal integrity.

In view of the aforementioned representative deficiencies in the art (or some other related shortcoming), need exists for improving isolation on adjacent optical waveguides. Need also exists for a capability that can eliminate, reduce, mitigate, or otherwise manage optical crosstalk. Further need exists for a means to suppress crosstalk passively in integrated optical devices. A technology addressing such need would benefit systems and applications that utilize light, for example helping achieve size reduction, higher integration, improved manufacturability, lower cost, better power utilization, greater isolation, higher fidelity signals, etc.

SUMMARY

The present invention can support disposing two or more optical paths near one another while isolating the light paths to avoid optical crosstalk or unwanted coupling of light between or among the paths. Such optical paths can provide one or more buses for carrying optical communication signals, coherent light, optical power, and/or laser energy; one or more pairs of digital or analog communication links; multiple optical amplifiers; an array of modulated or unmodulated lasers; an array of silicon photonic devices, optical pumping devices, or pump lasers; an optical backplane; two or more optical interconnects, "short range optical interconnects," or "ultra short range optical interconnects;" adjacent optoelectronic or electro-optic devices; two or more waveguides delivering photonic energy including visual illumination for lighting; a compact group of single mode (or multimode) waveguides; an optical network connecting cores for a multicore processor or components of a central processing/processor unit ("CPU"), a general processing unit ("GPU") or other computing system; a photonic bus for a microprocessor, microcontroller, or multi-chip module ("MCM"); adjacent optical traces or lines on a photonic integrated circuit ("PIC") or a planar lightguide circuit ("PLC"), also known as a planar lightwave circuit; waveguides attached to, integrated with, or embedded in a substrate; or some other appropriate device, application, or system involving light transmission, for example (not an exhaustive list).

In one aspect of the present invention, at least two optical waveguides can extend or run beside one another and can be sufficiently close to one another such that photonic energy from one of the optical waveguides has a propensity to couple or transfer to the other optical waveguide, for example manifesting itself as crosstalk. As a discussion aid, the optical waveguide receiving crosstalk can be referred to as the first optical waveguide, while the optical waveguide causing or producing the crosstalk can be referred to as the second waveguide. (The words "first" and "second" are not intended to imply any ordering, architecture, or geometry, but merely to conveniently differentiate the two optical waveguides from one another to facilitate this discussion.) The first optical waveguide can comprise a phase shifter disposed between a first section or segment of the first optical waveguide and a second section or segment of the first optical waveguide.

Thus, a phase shifter or an operability for advancing or delaying one or more electromagnetic cycles can affect light that is flowing on the first optical waveguide, and that light may be either crosstalk or light that induces crosstalk. The phase shifter can be a material, feature, apparatus, or system that shifts the phase of light transmitting on or over the first optical waveguide. The phase shifter can comprise a longitudinal variation in refractive index; a bend, curl, curve, wrinkle, fold, ripple, or kink in the optical waveguide; a short-term deviation in optical waveguide direction; a change in refractive index of the optical waveguide's core; a change in refractive index of the optical waveguide's cladding; a change in the difference or ratio between the refractive indices of the core and the cladding of the optical waveguide; a change in the refractive index profile (e.g. taken in cross section) of the optical waveguide; a change in optical waveguide diameter; a gap, separation, or spacer between segments or sections of optical waveguide; an optical cavity; a thin film through which light passes; a physical hollow, corrugation, or etched section adjacent the optical waveguide; an change in dopant concentration, ions, or defects of waveguide material or material adjacent the waveguide; an area that has been exposed to intense ultraviolet light so as to alter optical and/or material characteristics of a waveguide segment; a means for increasing or decreasing the speed of light on a selected length of the waveguide; or some other means for shortening or lengthening the periodic variations, cycles, or waves of electrical and magnetic fields associated with light on part of the waveguide, for example.

The second optical waveguide can also comprise two sections or segments of waveguide. The terms "section" and "segment," as used herein, are not intended to be construed as requiring any demarcation, delineation, or feature that separates one section or segment from another section or segment. Rather, each of those terms generally refers to a longitudinal part of the optical waveguide, that may or may not be contiguous and adjoining another section or segment. Further, two sections or segments can meet seamlessly with one another, with no visible interface, and can be indistinguishable from one another.

Light flowing on the first section or segment of the second optical waveguide can couple crosstalk onto the first section of the first optical waveguide. That coupled crosstalk can propagate over the first section of the first optical waveguide towards the phase shifter and the second section of the first optical waveguide. The phase shifter can change the crosstalk phase, for example delaying the crosstalk about one-half of a cycle, 180 degrees, or π radians. The coupled crosstalk that has been phase shifted can pass from the phase shifter to the second section of the first optical waveguide. Thus, crosstalk originating on the first section of the first optical waveguide can exhibit a phase shift while propagating on the second section of the first optical waveguide.

The crosstalk-producing light can flow from the first section or segment of the second optical waveguide to the second section or segment of the second optical waveguide. As the crosstalk-producing light propagates on the second section or segment of the second optical waveguide, that light can couple crosstalk onto the second section or segment of the first optical waveguide. The crosstalk that has directly coupled onto the second section or segment of the first optical waveguide can be out of phase from the crosstalk that coupled onto the first section or segment of the first optical waveguide and then flowed to the second section or segment via the phase shifter. The difference in phase can be about one-half of a cycle, 180 degrees, or π radians, for example, or some other appropriate amount. The two crosstalks can interact with one another to suppress or mitigate crosstalk, for example via destructive interference. Thus, the two crosstalks can cancel or suppress one another.

As an alternative to (or in addition to) the phase shifter of the first optical waveguide suppressing crosstalk on the first optical waveguide, the phase shifter can produce destructive interference of crosstalk on the second optical waveguide that has coupled from the first waveguide to the second waveguide. That is, crosstalk suppression can result either from phase shifting the crosstalk or from phase shifting the light that produces the crosstalk.

As an alternative, or as an augmentation, to phase shifting crosstalk after the crosstalk is coupled onto the first optical waveguide, phase shifting can occur as the crosstalk is coupled between the two optical waveguides. Thus, one or more phase shifters can be disposed between the first and second optical waveguides so that crosstalk elements coupled onto the first optical waveguide can have different phases. Via such phase difference(s), those coupled crosstalk elements can interact with one another to suppress crosstalk. The coupled crosstalk elements can destructively interfere with one another.

The discussion of isolating light paths presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following detailed description and the associated figures. It is intended that all such aspects, systems, methods, features, advantages, and objects are to be included within this description, are to be within the scope of the present invention, and are to be protected by the accompanying claims.

BRIEF DESCRIPTION OF THE DRAWINGS

FIG. 1A is a functional block diagram illustrating an optical waveguide coupling crosstalk onto an adjacent optical waveguide that comprises a provision for suppressing the coupled crosstalk via destructive interference in accordance with certain exemplary embodiments of the present invention.

FIG. 4A and FIG. 4B are refractive index graphs for two adjacent optical waveguides that are optically isolated from one another in accordance with certain exemplary embodiments of the present invention.

FIG. 4C is a graph of phase difference between two adjacent optical waveguides that are optically isolated from one another and suppress crosstalk in accordance with certain exemplary embodiments of the present invention.

Figure 1B:
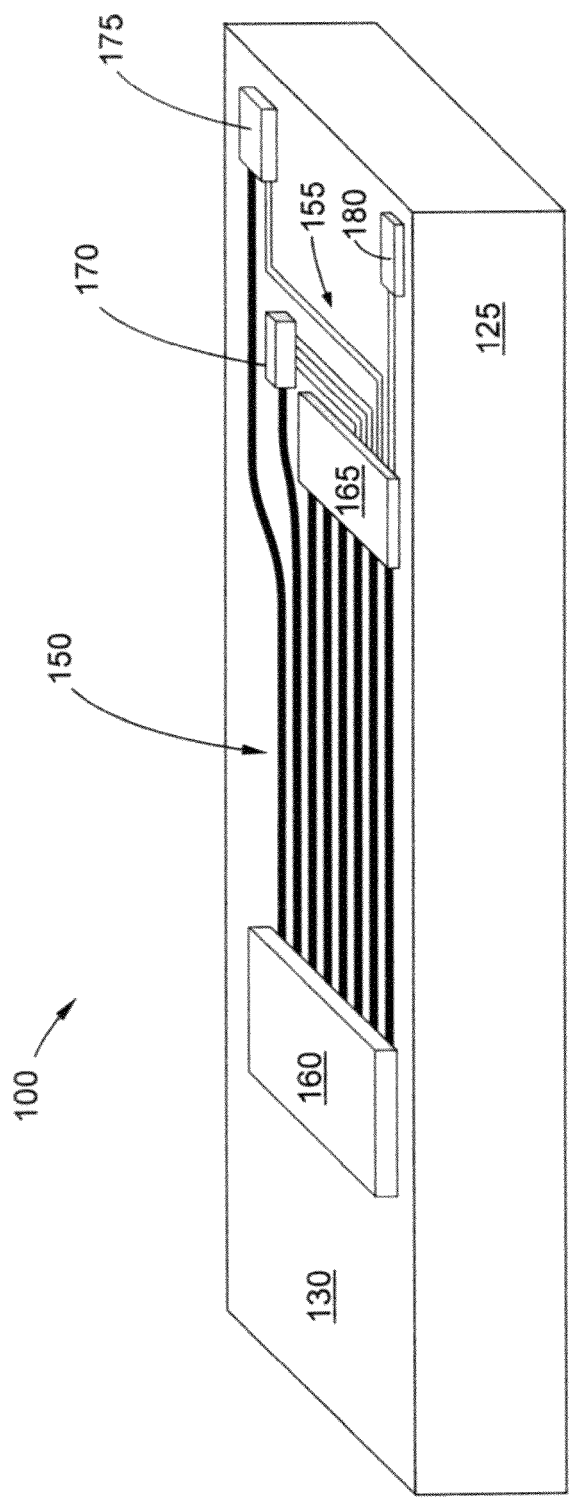
FIG. 1B is a perspective illustration of a system that comprises an array of optical waveguides that are optically isolated from one another in accordance with certain exemplary embodiments of the present invention.

Many aspects of the present invention can be better understood with reference to the above drawings. The elements and features shown in the drawings are not necessarily to scale, emphasis instead being placed upon clearly illustrating principles of exemplary embodiments of the present invention. Moreover, certain dimensions may be exaggerated to help visually convey such principles. In the drawings, reference numerals designate like or corresponding, but not necessarily identical, elements throughout the several views.

DETAILED DESCRIPTION OF EXEMPLARY EMBODIMENTS

Certain exemplary embodiments of the present invention support disposing optical waveguides close to one another while avoiding the transmission of unwanted light energy that couples between or among optical waveguides.

The present invention will be described more fully hereinafter with reference to FIGS. 1-14, which describe representative or illustrative embodiments of the present invention.

The present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting and among others supported by representations of the present invention.

Turning now to FIG. 1A, this figure illustrates a functional block diagram for an optical waveguide 150B coupling crosstalk 650, 675 onto an adjacent optical waveguide 150A that comprises an exemplary provision for suppressing the coupled crosstalk 650, 675 via destructive interference according to certain embodiments of the present invention. FIG. 1A will be discussed largely from the exemplary perspective of crosstalk 650, 675 being coupled onto the optical waveguide 150A by an optical signal 575 that is propagating on an adjacent optical waveguide 150B. However, the waveguides 150 can also suppress crosstalk imposed on the optical waveguide 150B by an optical signal propagating on the optical waveguide 150A.

The optical signal 575 propagates on the optical waveguide 150B as one or more waves of oscillating electrical and magnetic fields, as electromagnetic radiation, and/or as photons. The optical waveguide 150B (as well as the optical waveguide 150A) is typically single mode (or mono-mode), but may alternatively be bimodal or multi modal. As an alternative to an optical signal 575 that is modulated to convey digital or analog information, the optical waveguide 150B can transmit un-modulated light. Such un-modulated light can power an electrical device that converts the light into electricity, provide photonic energy for pumping an optically pumped laser or an optical amplifier, stimulate photonic emissions of a material, generate illumination, etc.

The waveguide 150B can transmit one optical signal at any one time, or transmit multiple signals simultaneously. Thus, the waveguide 150B can transmit multiple dense wavelength division multiplexing ("DWDM") signals, course wavelength division multiplexing ("CWDM") signals, wavelength division multiplexing ("WDM") signals, time division multiplexing ("TDM") signals, etc. The optical signal 575 can have a coherent, single mode light wave that is substantially monochromatic, for example as may be emitted by a semiconductor laser suited for DWDM. In the following discussion, the optical signal 575 will be discussed in the exemplary context of being substantially coherent, being substantially single mode, and being in a substantially narrow spectral range (of wavelengths). Alternatively, the optical signal 575 can be incoherent, can be multimode, and/or can be of multiple wavelengths or colors, for example as might be emitted from a light emitting diode ("LED") or an incandescent light. Further, in certain exemplary embodiments, the optical signal 575 can be emitted from a free-running Fabry-Perot laser or a vertical cavity surface emitting laser ("VCSEL").

As the optical signal 575 travels over the optical waveguide 150B, the signal 575 transfers energy to the optical waveguide 150A to produce crosstalk 650, 675 on the optical waveguide 150A. In certain exemplary embodiments, the energy transfer 625 results from the electromagnetic field of the optical signal 575 extending to the optical waveguide 150A. In certain exemplary embodiments, the energy transfer 625 results from elastic scattering, inelastic scattering, or fluorescence in the material of the waveguide 150B or from some other light-matter interaction. Further, one or more material defects in the waveguide 150B can cause light to escape from the waveguide 150B, with one or more material defects in the waveguide 150A facilitating the waveguide 150A receiving and guiding the escaped light. In certain exemplary embodiments, the energy transfer 625 is attributable to one or more cladding modes. In certain exemplary embodiments, the energy transfer 625 results from light exiting the waveguide 150B as a result of "overfilling" the waveguide 150B. That is, at the point the optical signal 575 is launched or coupled into the waveguide 150B, the optical signal 575 may have had a mode profile or an angular characteristic that deviates from a perfect match to the waveguide 150B, resulting in some of the energy of the optical signal 575 escaping from the waveguide 150B. In certain exemplary embodiments, the crosstalk 650, 675 results from two or more of the aforementioned effects, or from some other energy transfer mechanism or phenomenon.

As the optical signal 575 travels over the portion of the optical waveguide 150B that is adjacent the waveguide segment 325 of the optical waveguide 150A, the crosstalk 650 couples onto the waveguide segment 325 of the optical waveguide 150A via energy transfer 625A. The crosstalk 650 then propagates on the waveguide segment 325 towards the waveguide segment 375 and encounters the phase shifter 350. The phase shifter 350 applies a phase shift to the crosstalk 650 so that the crosstalk 650 is phase shifted, for example about 180 degrees, π radians, or one-half of a cycle, for transmission on the waveguide segment 375. Thus, the crosstalk 650 has been phase shifted when the crosstalk 650 is propagating on the waveguide segment 375 of the optical waveguide 150A.

As the optical signal 575 travels over the portion of the optical waveguide 150B that is adjacent the waveguide segment 375 of the optical waveguide 150A, the energy transfer 625B couples the crosstalk 675 onto the waveguide segment 375. On the waveguide segment 375, the crosstalk 650 is phase shifted as discussed above (for example about 180 degrees, π radians, or one-half of a cycle) relative to the crosstalk 675. Accordingly, the crosstalk 650 and the crosstalk 675 destructively interfere with one another. The destructive interference suppresses both of the crosstalks 650 and 675.

With crosstalk 650, 675 suppressed on the optical waveguide 150A, the optical waveguide 150A achieves an improved capability for carrying optical signals (or some other form of luminous energy). For example, a detector (not illustrated) that is disposed to receive light propagating over the optical waveguide 150A will receive the intended light with little or no unwanted reception of the crosstalk 650, 675.

The term "optical waveguide" or "waveguide," as used herein, generally refers to a device or structure that directs, controls, or steers light to flow along a path, course, route, or channel and confines, limits, or binds the light so the light generally says on or in the path, course, route, or channel. An optical waveguide can comprise one or more structures that guide and/or generally confine light during transmission. For example, such an optical waveguide can comprise an elongate or elongated section of optical material that has high refractive index relative to an adjacent material, such as a cladding. In this configuration, the cladding helps keep the light on course. Another type of waveguide can comprise a material with a pattern of structures, such as elongate holes, that help transmitting light maintain a prescribed course of travel without unwanted or excessive divergence or loss. Such a waveguide embodiment can be a "holey fiber" or a "photonic crystal fiber," for example.

Turning now to FIG. 1B, this figure illustrates a system 100 that comprises an exemplary array of optical waveguides 150 that are optically isolated from one another according to certain embodiments of the present invention. FIG. 1B further illustrates an exemplary operating environment for practicing the technology discussed above with reference to FIG. 1A and an exemplary apparatus that comprises the optical waveguides 150 of FIG. 1A. The array of optical waveguides 150 of the system 100 can comprise multiple instances of the two optical waveguides 150A and 150B illustrated in FIG. 1A.

The exemplary system 100 comprises a substrate 125 with a face or top surface 130. The optical waveguides 150 can be buried into or under the surface 130 or attached thereto. The system 100 exemplifies a PLC or PIC that comprises optical, electrical, and optoelectronic features or components. An array of lasers 160 couples light into the optical waveguides 150, while an array of detectors 165 receives the light. In an exemplary embodiment, the array of lasers 160 are pump lasers that energize the optical waveguides 150 as a silicon photonic circuit. In certain exemplary embodiments, each optical waveguide 150 comprises a lasing cavity. Thus, light can circulate or resonant in each optical waveguide 150.

Electrical traces 155 conduct electricity and electrical signals to and from the detector array 165. A power supply 175 receives monitoring light from one of the optical waveguides 150 and adjusts the array of detectors 165 according to the monitored power. A edge emitting laser 170 sends back signals to the array of lasers 160 over one of the optical waveguides 150. Thus, the array of optical waveguides 150 can operate bidirectionally. A signal processor 180 processes electrical signals output by the array of detectors 165.

In certain exemplary embodiments, the system 100 facilitates two or more sites, nodes, or terminals sending and receiving information, either directly between one another or in communication with some other site or sites on an optical network. The system 100 can be part of an optical network, for example a wide area network ("WAN") that may span across a country, a state, or a significant geographic region. Alternatively, the system 100 can be a component of a node or site within a local area network ("LAN"), a home network, a fiber-to the-home ("FTTH") network, an access network, or one or more communication links within a local area (not an exhaustive list). In some exemplary embodiments, a multi-core microprocessor system (or some other computing processor) comprises the system 100. As one more example, the system 100 can support one or more optical interconnects or optical links for a backplane or an optical bus that transmits information within communications or computing equipment. According, the system 100 can serve or be a component of a wide variety of communication devices or systems.

In various exemplary embodiments, the array of optical waveguides 150 can be (or comprise) one or more short-range optical interconnects, intermediate-range optical interconnects, ultra-short range optical interconnects, an optical bus, a backplane, a path between multiple users on a FTTH or LAN network, part of a long-haul network, one or more optical links of a multi-core microprocessor, etc.

Various embodiments of the optical waveguides 150 and/or the system 100 can support a wide range of applications and operating environments, such as optical networking systems, optical communication applications, and computing devices. Such systems and applications can include WANs, LANs, metropolitan area networks ("MANs"), FTTH networks, fiber-to-the-curb ("FTTC") networks, fiber-to-the-whatever ("FTTX") networks, fiber-to-the-premises ("FTTP") networks, access networks, intra-cabinet communications, backplane communications, intra-computer communications, inter-computer communications, intra-core communications, buses for digital signal processors ("DSPs"), buses for systems on a chip ("SOCs"), chip-to-chip optical interconnects, core-to-core optical interconnects, optical links between or among features on a single chip, optical lines in multi-chip modules ("MCMs") and microprocessor buses, to mention a few examples. The optical waveguides 150 can be part of a network that may span across a country, a state, or a significant geographic region. Moreover, these elements can be part of a LAN, a home network, an FTTH network, an access network, one or more communication links within a local area, etc.

In certain exemplary embodiments, the system 100 can be a receiver that supports receiving third-party messages, downloading Internet website content, watching television via the Internet, conducting voice-over-Internet-protocol ("VoIP") telephone conversations, downloading or accessing videos or songs, handling wireless backhaul content, etc. The system 100 can further accommodate computing, voice communications, message exchanges, entertainment, or some other appropriate application or usage supported by optical communications. Moreover, the system 100 can be a light processor, a unit of a computer, a transmitter, a transceiver, a router, or some other appropriate communication, computing, or entertainment device, for example.

Embodiments of the system 100 can be essentially or substantially contained within a single piece of equipment, in a single enclosure, or in a single package such as a dual inline pin ("DIP") package. In various exemplary embodiments, the system 100 can have a geometric form of a butterfly-type package, a DIP package, a "XENPAK" package, an "XPAK"

package, an "X2" package, a "small form-factor pluggable" ("SFP") package, an "XFP" package, a die, a TO-56 header package, an industry-standard package, a MCM package, a package conforming to a multi-source agreement ("MSA") package, etc. Thus in certain exemplary embodiments, the system 100 comprises multiple components, elements, or material systems in a common enclosure. Such an enclosure may be hermetically sealed or have a level of permeability.

The system 100 can comprise various discrete electrical, digital, logic, electronic, optical, and optoelectronic components. In certain exemplary embodiments, the system's optical, optoelectronic, and electrical circuitry elements are provided in a common material system such as lithium niobate, indium phosphide, or silicon. Furthermore, such optical, optoelectronic, and electrical circuitry elements can be grown on a common substrate.

In certain exemplary embodiments, the waveguides 150 (and other elements illustrated in FIG. 1B and/or other waveguide embodiments disclosed herein) can be mounted on the substrate 125. The substrate 125 can comprise a plate, block, sheet, wafer, or slab of material, with a composition of glass, silica, sapphire, aluminum oxide, ceramic, or silicon, for example. In certain embodiments, the substrate 125 is an optical bench or a silicon optical bench ("SiOB"). In certain exemplary embodiments, the waveguides 150 are integrated in or grown on a semiconductor material, such as a silicon-based material, a crystalline material, a single crystal, InGaAs, germanium, InP, III-V material, III-V semiconductor material, etc. (along with other optical, electrical, and/or optoelectronic elements). Such components can be either monolithically integrated or hybrid integrated, for example. The waveguides 150 and associated devices can be grown on, embedded in, or bonded to a common substrate (for example the substrate 130). The substrate 130 can provide a foundation comprising (or substantially consisting of) silicon with attached optical waveguides, for example as a crystal or as a monolithic platform. Further the waveguides 150 can have a format of "silicon-on-insulator," "silica-on-silicon," or "ribbed waveguide." Accordingly, the optical, optoelectronic, and/or electronic components of the system 100 can be a unitary structure, a monolithic system or "chip," or a collection of elements fastened or bonded together. Further, the system 100 can be implemented on a silicon, lithium niobate, or indium phosphide substrate, either as a monolithic or hybrid device.

In certain exemplary embodiments, the system 100 can comprise one or more diffractive elements, holographic lenses, concave lenses, convex lenses, cylindrical lenses, Fresnel lens, PLC features, prisms, circulators, isolators, lens arrays, ball lenses, micro-optic components, nano-optic elements, planar micro-lenses, ion-exchanged components, gradient index optics, free-space optics, integrated optics, modem optics, interconnects, crystals, lenslets, or other suitable active or passive components for manipulating light. (This, like all other lists and examples presented herein, is not exhaustive and is not limiting.)

In various exemplary embodiments, the array of detectors 165 can comprise avalanche photodiodes ("APDs"); pin photodiodes; charge coupled devices ("CCDs"); transimpedance amplifiers; detection devices comprising silicon, indium phosphide, indium gallium arsenide, lithium niobate, gallium arsenide, etc.; technology for converting optical signals into electrical signals; or some other means for sensing, detecting, or receiving, light, for example.

Figure 2:
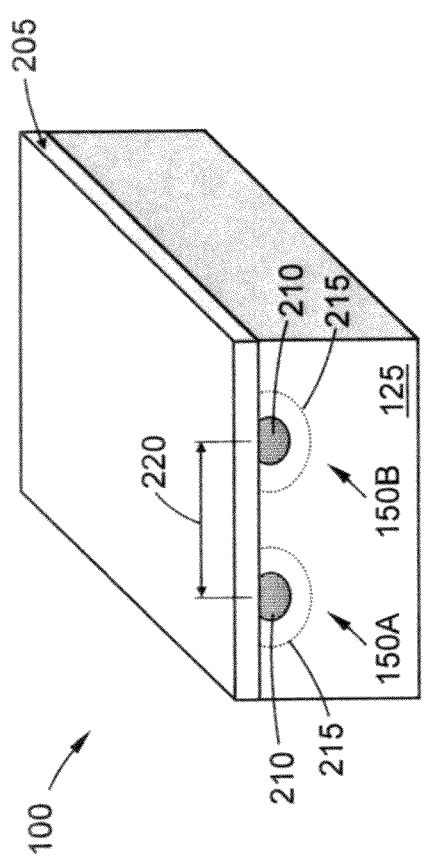
FIG. 2 is a perspective illustration of two adjacent optical waveguides that have a propensity to interfere with one another in operation via crosstalk and yet are optically isolated from one another in accordance with certain exemplary embodiments of the present invention.

Turning now to FIG. 2, this figure illustrates two exemplary adjacent optical waveguides 150A. 150B that have a propensity to interfere with one another in operation via crosstalk and yet are optically isolated from one another according to certain embodiments of the present invention. FIG. 2 further illustrates an end-on view of the optical waveguides 150 illustrated in FIGS. 1A and 1B and discussed above, such as would result from taking a cross section through two optical waveguides 150A, 150B in the array of optical waveguides 150 depicted in FIG. 1B.

In the exemplary embodiment of FIG. 2, the waveguide cores 210 of the optical waveguides 150A and 150B are buried in the substrate 125, and the substrate 125 is covered with a layer of cladding material 205. The illustrated configuration can be fabricated via using photolithography to produce a metal (or dielectric) mask defining an outline on the surface of the substrate 125 for the optical waveguides 150A and 150B (for example outlining the waveguide cores 210). Then, ion exchange can create ion concentrations within the substrate 125 according to the pattern of the metal mask, with the ion concentration profiles forming waveguide structures within the substrate 125. Following ion exchange and removal of the mask, the layer of cladding material 205 can be deposited on top of the substrate 125, for example as silicon dioxide or optical polymer.

In certain exemplary embodiments, the optical waveguides 150A and 150B can be all-dielectric waveguides. However in certain exemplary embodiments, the optical waveguides 150A and 150B can comprise an electrically conductive material or composition of materials. Thus, in various embodiments, the optical waveguides 150A and 150B can comprise appropriate dielectric or non-dielectric materials in appropriate configurations.

As an alternative to being associated with a slab-shaped structure, the two waveguide cores 210 can be disposed in a slender filament of flexible optical material (for example glass or silica) to provide a multi-core optical fiber that can be wound on a reel. Thus, an optical fiber in the form of a filament comprising silica can comprise multiple waveguide cores 210 that avoid detrimental crosstalk. Moreover, such an optical fiber can comprise a group or cluster of waveguide cores 210 circumferentially surrounded by a common cladding. Thus, a single filament optical fiber can comprise two, three, four, five, ten, fifteen twenty, etc. waveguide cores extending along and embedded in the optical fiber while being substantially optically isolated from one another.

Referring to FIG. 2, in operation, each of the optical waveguides 150A and 150B has an associated electromagnetic field extending radially outward from the waveguide core 210. That is, light flowing through each of the optical waveguides 150A and 150B produces a respective energy field around the periphery of each the waveguide cores 210. Such energy fields would typically extend into the substrate 125 and into the layer of cladding material 205. Especially in single mode optical waveguides, but also in multimode fibers, a significant fraction of the energy in a bound mode travels outside the core 210.

In certain exemplary embodiments, the field strength decays exponentially from the interface of the waveguide core 210 or exhibits a Gaussian distribution. At the peripheral location 215, the field strength has fallen off to lie or about 37 percent of the field strength at the boundary of the waveguide core 210. The physical size of the peripheral location 215 typically depends upon the wavelength of the light flowing in the waveguide core 210 and producing the field, the diameter of the waveguide core 210, and the refractive index profile or the refractive index differential between the material of the waveguide core 210 and the material(s) surrounding the core 210. (In this example, regions of the substrate 125 and the layer of cladding material 205 both can function as optical cladding.)

Waveguide analysis or modeling shows additional details about how light energy of the waveguide 150A, 150B is not entirely confined to the waveguide core 210. In certain exemplary embodiments, an energy distribution or mode field diameter is determined from a mathematical model known as "Petermann's Second Definition of mode-field diameter." Such spatial information can further be determined via experimentally measuring the far field and relating the far field measurement data to the near field via the "Hankel Transform."

In certain exemplary embodiments, the tail of the energy distribution of light can reach between two adjacent optical waveguides 150A, 150B to cause crosstalk. For example, in certain embodiments, the distance 220 between the optical waveguides 150A and 150B is such that the energy field of the optical waveguide 150B extends to the optical waveguide 150A. Light can thereby couple onto optical waveguide 150A as crosstalk that impairs transmission or reception of other light transmitting on the optical waveguide 150A.

In an exemplary embodiment, the distance 220 between the optical waveguides 150A and 150B is less than about 30 times the wavelength of light propagating through at least one of the optical waveguides 150A and 150B. In an exemplary embodiment, that distance 220 is less than about 25, 20, or 15, or 10 times the wavelength of light propagating through at least one of the optical waveguides 150A and 150B. Further, the distance 220 can be in a range between any two of those values. In various exemplary embodiments, the wavelength of that light can be about 1710 nm, 1550 nm, 1400 nm, 1310 nm, 900 nm, 600 nm, 300 nm, or in a range between any two of those wavelengths, for example.

In an exemplary embodiment, the distance between the physical edges of the cores 210 of the optical waveguides 150A and 150B is less than about 30 times the wavelength of light propagating through at least one of the optical waveguides 150A and 150B. In certain exemplary embodiments, the distance between the physical edges of the two cores 210 is less than about 25, 20, 15, 10, or 5 times the wavelength of light propagating through at least one of the optical waveguides 150A and 150B. Further, that separation between the cores 210 can be in a range between any two of those values. In various exemplary embodiments, the wavelength of that light can be about 1710 nm, 1550 nm, 1400 nm, 1310 nm, 900 nm, 600 nm, 300 nm, or in a range between any two of those wavelengths, for example.

In certain exemplary embodiments, a cladding of each of the two optical waveguides 150A and 150B has a thickness that is less than about 10, 8, 6, 5, or 3 times the wavelength of waveguided light.

Accordingly, the waveguide cores 210 can be sufficiently close to one another such that crosstalk could be problematic if not for suppressing crosstalk as described herein.

Figure 3:
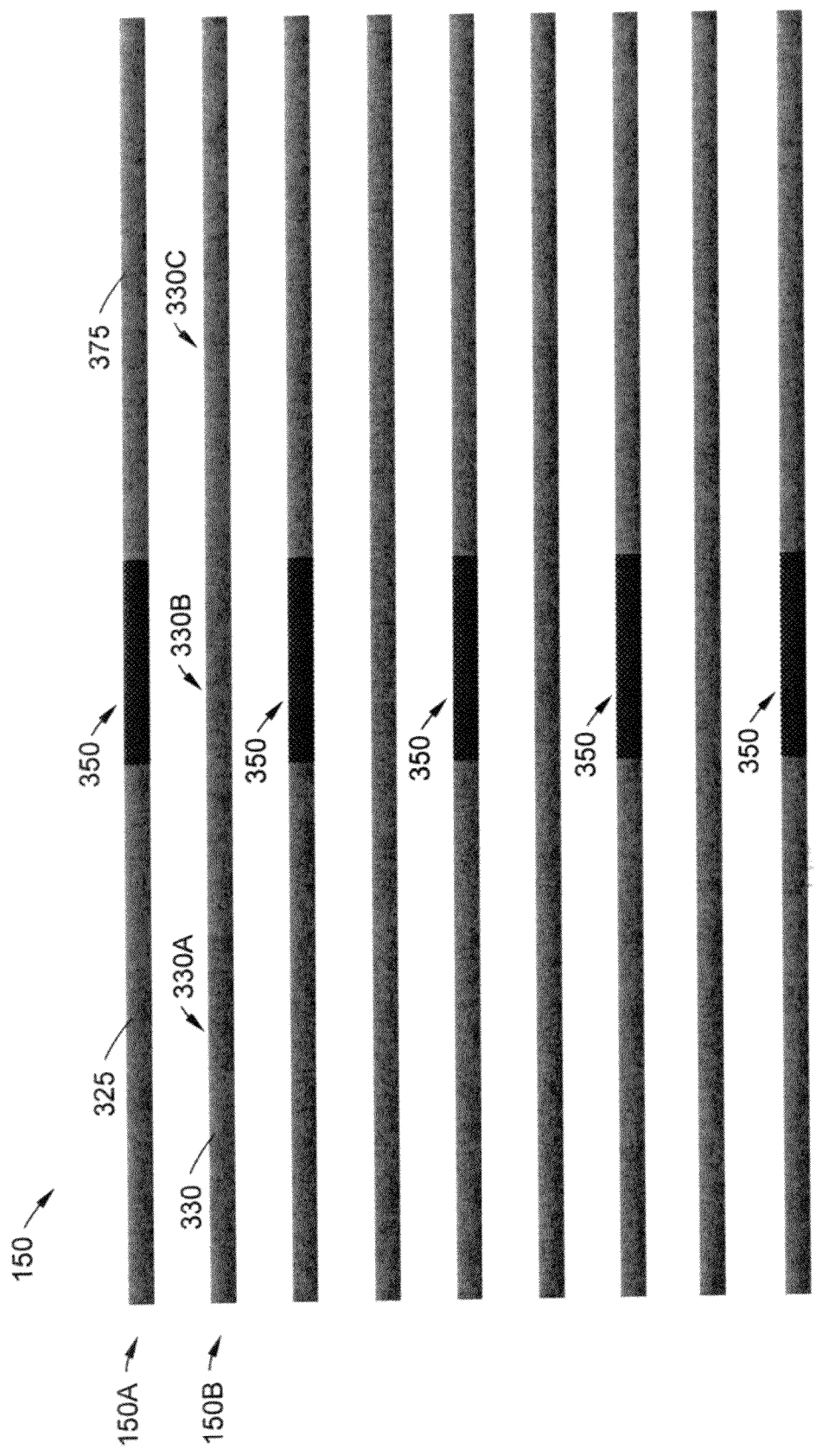
FIG. 3 is an illustration of an array of optical waveguides that are optically isolated from one another in accordance with certain exemplary embodiments of the present invention.

Turning now to FIG. 3, this figure illustrates an exemplary array of optical waveguides 150 that are optically isolated from one another according to certain embodiments of the present invention. In the illustrated embodiment, optical waveguides 150B comprising phase shifters 350 are interposed or interleaved between other optical waveguides 150A. Accordingly, in the illustrated exemplary embodiment, each of the optical waveguides 150 is adjacent at least one other of the optical waveguides 150 that provides a relative phase shift.

The optical waveguide 150B comprises three sections (or segments) 330A, 330B, and 330C, wherein the three segments 330A, 330B, and 330C collectively make up the section (or segment) 330. The section 330A of the optical waveguide 150B is in crosstalk communication with the section 325 of the optical waveguide 150A. The section 330C of the optical waveguide 150B is in crosstalk communication with the section 375 of the optical waveguide 150A. The section 330B of the optical waveguide 150B is generally adjacent the phase shifter 350 of the optical waveguide 150A.

In certain exemplary embodiments, the phase shifters 350 are relatively short. Alternatively, a single phase shifter 350 can span across most or all of the optical waveguide 150A. In certain exemplary embodiments, the sections or segments 325 and 375 of the optical waveguide 150B have substantially the same length. Alternatively, the sections or segments 325 and 375 can have substantially different lengths.

Turning now to FIG. 4A and FIG. 4B, these figures illustrate exemplary refractive index graphs 405, 420 for two adjacent optical waveguides 150A, 150B that are optically isolated from one another according to certain embodiments of the present invention. As illustrated in FIG. 4A, the three sections 330A, 330B, and 330C of the optical waveguide 150B can have like refractive indices. In other words, light propagates on each of these sections 330A, 330B, and 330C at substantially the same speed.

As illustrated in FIG. 4B, the refractive index of the optical waveguide 150A can vary with distance. The segments 325 and 375 of the optical waveguide 150A have a uniform refractive index. Meanwhile, the refractive index of the segment 350 (which comprises the phase shifter 350) of the optical waveguide 150A is elevated relative to the two segments 325 and 375. (In the following discussion and in the accompanying figures, the phase shifter 350 may be referred to as the segment 350 when deemed beneficial to this description.) Via the elevated refractive index, light slows down on the segment 350. In various exemplary embodiments, the refractive index transition between the segment 350 and the adjacent segments 325 and 375 can be either smooth and gradual, abrupt, or substantially discontinuous (mathematically).

In certain exemplary embodiments, the segment 350 can have a refractive index profile that rises to a peak and then falls, such as following a Gaussian function or a "bell-shaped curve." For example, the refractive index of the segment 350 can generally conform to the following equation:

$$f(x) = ae^{-(x-b)^2/2c^2}$$

In this equation, f(x) represents refractive index, a reciprocal of transmission speed, a reciprocal of transmission speed that is normalized or scaled according to transmission speed in a vacuum, or some other appropriate parameter that correlates with transmission speed. Longitudinal distance along the segment 350 is represented by "x." The term "a" represents the maximum value of f(x), that is, the peak refractive index, a reciprocal of transmission speed, a reciprocal of transmission speed that is normalized or scaled according to transmission speed in a vacuum, or some other appropriate parameter that correlates with transmission speed. The term "b" represents the longitudinal position of the peak. The term "e" controls the steepness with which the curve rises and falls, or the width of the bell.

Turning now to FIG. 4C, this figure illustrates an exemplary graph 460 of phase difference between two adjacent optical waveguides 150A, 150B that are optically isolated from one another and suppress crosstalk according to certain embodiments of the present invention.

The graph 460 can be viewed as representing the difference in phase between two light waves (or signals), one propagating on the optical waveguide 150A and one propagating on the optical waveguide 150B after being launched in phase with respect to one another. As the two light waves propagate over their respective segments 325 and 330A, they remain in phase. When the signals propagate respectively over the segment 330B and the segment 350, a phase shift occurs or accumulates between the two light waves. As the light waves respectively propagate over segments 330C and 375, that phase shift remains.

Accordingly, the graph 460 describes how a difference in refractive index between two adjacent optical waveguides 150A, 150B can produce a relative phase difference. One optical waveguide 150A, 150B can have a phase that leads (or lags) the phase of the other optical waveguide 150A, 150B.

Figure 5:
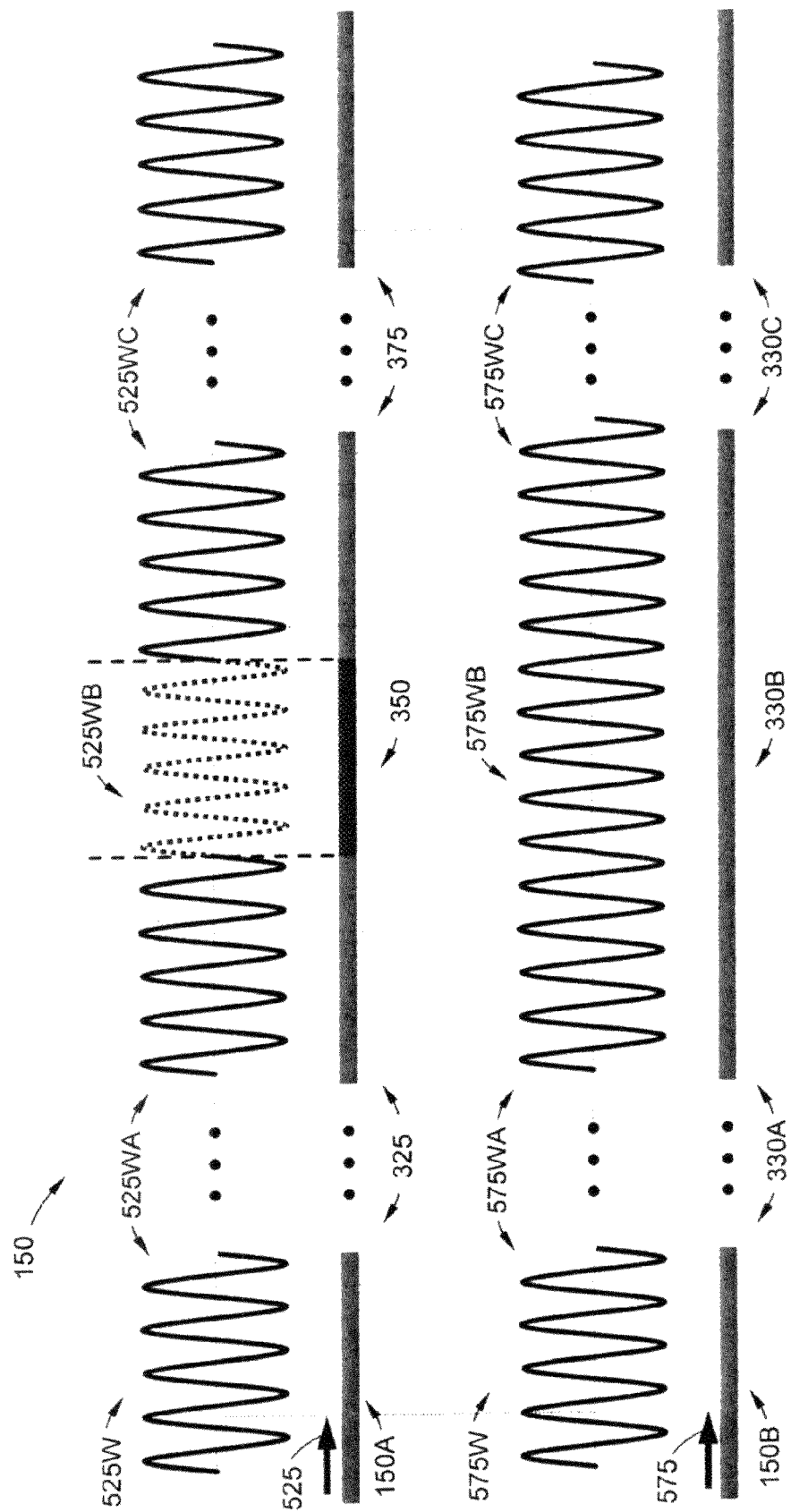
FIG. 5 is an illustration depicting phase relationships of two electromagnetic light waves transmitting respectively over two adjacent optical waveguides that are optically isolated from one another in accordance with certain exemplary embodiments of the present invention.

Turning now to FIG. 5, this figure illustrates exemplary phase relationships of two electromagnetic light waves transmitting respectively over two adjacent optical waveguides 150A, 150B that are optically isolated from one another according to certain embodiments of the present invention. Those two electromagnetic light waves are exemplarily embodied in the optical signals 525 and 575. That is, the optical signals 525 and 575 typically comprise electromagnetic light waves. FIG. 5 further provides more information about the exemplary scenario illustrated in FIGS. 4A, 4B, and 4C (collectively FIG. 4) and discussed above.

Rather than mere describing an exemplary mode of operation of the optical waveguides 150 while those waveguides 150 are mitigating crosstalk, FIG. 5 (and FIG. 4) can be viewed as illustrating exemplary properties or characteristics of the optical waveguides 150 that support or lead to crosstalk mitigation, as will be further described below. As will be discussed in more detail below with reference to FIG. 6, the optical waveguides 150 can operate and mitigate crosstalk whether or not both optical signals 525, 575 are transmitting. Further, various embodiments of the present invention can operate effectively whether or not the optical signals 525 and 575 have common characteristics such as phase or wavelength.

FIG. 5 illustrates how two optical signals 525, 575 (respectively represented by the waveforms 525W and 575W) that are initially in phase can be phase shifted with respect to one another as they travel over respective optical waveguide 150A and 150B. The waveform 525W of the optical signal 525 comprises the waveform 525WA on the section 325, the waveform 525WB on the phase shifter 350 (section 350), and the waveform 525WC on the section 375. The waveform 575W of the optical signal 575 comprises the waveform 575WA on the section 330A, the waveform 575WB on the section 330B, and the waveform 575WC on the section 330C.

For the sections 325 and 330A, the waveform 525WA is in phase with the waveform 575W A. As illustrated, the waveforms 525WA and 575WA can have electrical fields (and/or magnetic fields) that rise and fall in step and/or synchronization with one another. Thus, the electromagnetic cycles of the exemplary waveforms 525WA and 525WB peak (and rise and fall) at substantially the same time and/or at substantially the same longitudinal location of the respective optical waveguides 150A and 150B. As illustrated, the high points of the waveform 525WA occur in substantial synchronization with the high points of the waveform 575WA.

For the section 330B and the section 350, a phase shift occurs as the optical signals 575 and 525 respectively propagate thereon. As the optical signal 525 propagates on the section 350 and the optical signal 575 propagates on the section 330B, the waveform 525WB shifts relative to the waveform 575WB. As a result of this phase shift, the waveform 525WB can be about 180 degrees or one-half of a cycle out of phase with the waveform 575WB at the respective interfaces to the sections 375 and 330C.

Those ordinarily skilled in the art having benefit of this disclosure will appreciate that two waves can be 180 degrees, $\pi$ radians, or one-half of a cycle out of phase as a result of being out of phase 1½ times any of 360 degrees, $2\pi$ radians, or a full cycle. That is, a 180 degree phase shift can be the result of a phase shift of 180 degrees plus 360 degrees, 3 times 180 degrees, etc.; a phase shift of $\pi$ radians can result from a phase shift of $3\pi$, $5\pi$, or $7\pi$ radians; and a phase shift of one-half of a cycle can result from a phase shift of one-and-one-half full cycles.

In certain exemplary embodiments, the phase shift provided by the phase shifter 350 (section 350) can be estimated with (or can generally conform to) the following equation:

$$\Delta\Phi = L\Delta\eta/\lambda_o$$

In this equation, "$\Delta\Phi$" represents the phase shift in cycles, L represents the physical length of the phase shifter 350 (section 350), "$\Delta\eta$" represents the difference between the refractive index of the section 330B of the optical waveguide 150B and the refractive index of the phase shifter 350 (section 350) of the optical waveguide 150A, and "$\lambda_o$" represents the wavelength of the light as measured in a vacuum. Rather than determining refractive index based on measuring physical characteristics of the constituent materials making up the waveguides 150A, 150B, the refractive indices for $\Delta\eta$ can each be expressed as a ratio of transmission speed in a vacuum to waveguide transmission speed (e.g. as $c_o/c$). The vacuum wavelength $\lambda_o$ can be a specified operating wavelength, the vacuum wavelength of the optical signal 575 (or 525), and/or the crosstalk wavelength.

One of ordinary skill in the art having benefit of this disclosure can use a modeling equation, such as the equation discussed immediately above or some other appropriate approximation or computer simulation available to such an individual, to tailor the phase shifter 350 according to application specifics. For example, the length of the section 350 can be extended in situations where material properties limit the refractive index differential. As another example, a material system that provides a large difference in refract index can employ a phase shifter 350 having a shorter length.

As the optical signal 525 enters the section 375 of the optical waveguide 150A and the optical signal 575 enters the section 330C of the optical waveguide 150B, the high point of the waveform 525WB (of the optical signal 525) occurs at substantially the same time and/or longitudinal location as the low point of the waveform 575WB (of the optical signal 575). In other words, at the beginning of the sections 375 and 330C, a peak of the waveform 525 occurs at the same time and/or location as a trough of the waveform 575 and vice versa.

As the optical signal 525 propagates over the section 375 and the optical signal 575 propagates over the section 330C, the 180 degree phase shift remains. Thus, the peaks or high points of the waveform 525WC on the section 375 of the optical waveguide 150A continue to be synchronized in time and/or longitudinal distance with the valleys or low points of the waveform 575WC on the segment 330C of the optical waveguide 150B. In other words, the maximums of the waveform 525WC substantially coincide in time and/or distance with the minimums of the waveform 575WC.

Figure 6:
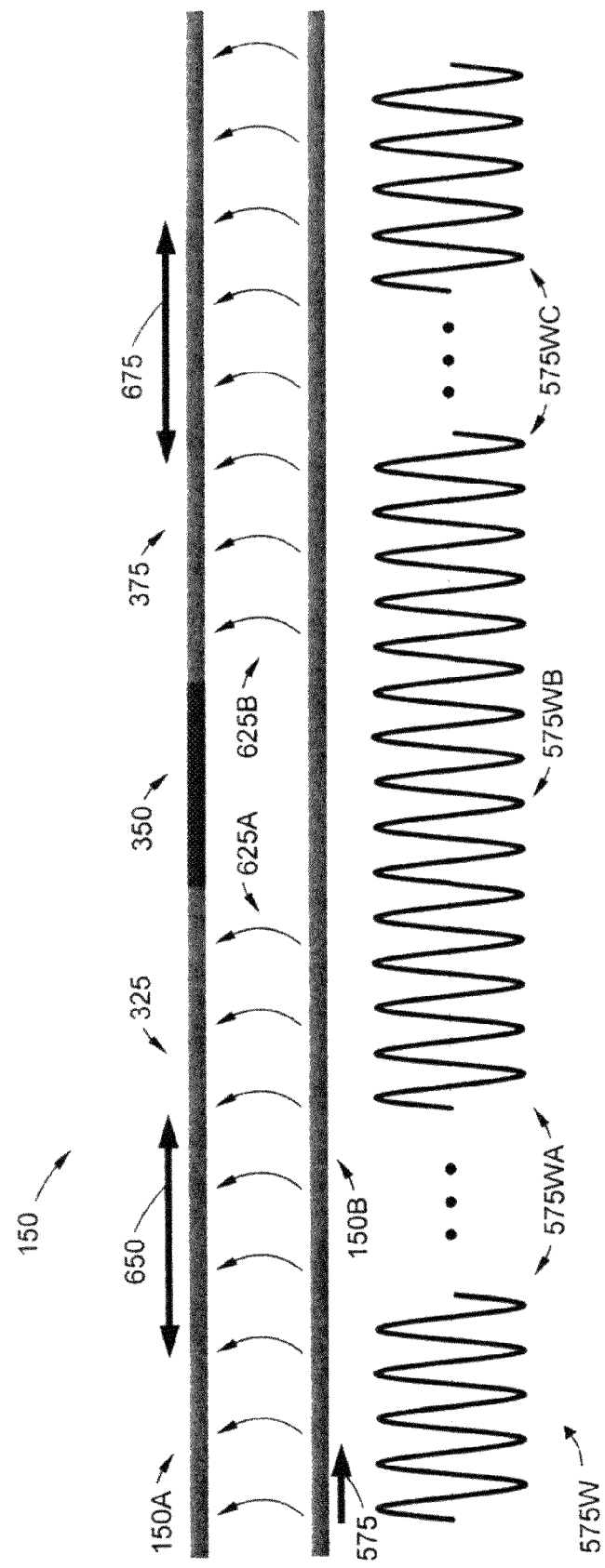
FIG. 6 is an illustration depicting an electromagnetic light wave transmitting on one optical waveguide and coupling crosstalk onto an adjacent optical waveguide in accordance with certain exemplary embodiments of the present invention.

Turning now to FIG. 6, this figure illustrates an exemplary electromagnetic light wave (in the form of the optical signal 575) transmitting on one optical waveguide 150B and coupling exemplary crosstalk onto an adjacent optical waveguide 150A according to certain embodiments of the present invention.

Whereas FIG. 5 illustrates the optical signal 525 transmitting on the optical waveguide 150A and the optical signal 575 transmitting on the optical waveguide 150B, the optical signal 525 is not illustrated in FIG. 6. The optical signal 525 may, or may not, be transmitting on the optical waveguide 150A in the example that FIG. 6 illustrates. The optical signal 525 has been removed from FIG. 6 to avoid cluttering the illustration and to aid describing operation of the illustrated embodiment. In the situation in which an optical signal 525 is propagating on the waveguide 150B, the optical signal 525 is not necessarily in phase with the optical signal 575, and the light waves of those optical signals 525, 575 do not necessarily have the same wavelength. Moreover, the waveguide 150B can suppress crosstalk coupled onto the waveguide 150B by the optical signal 525 propagating on the optical waveguide 150A.

Figure 7:
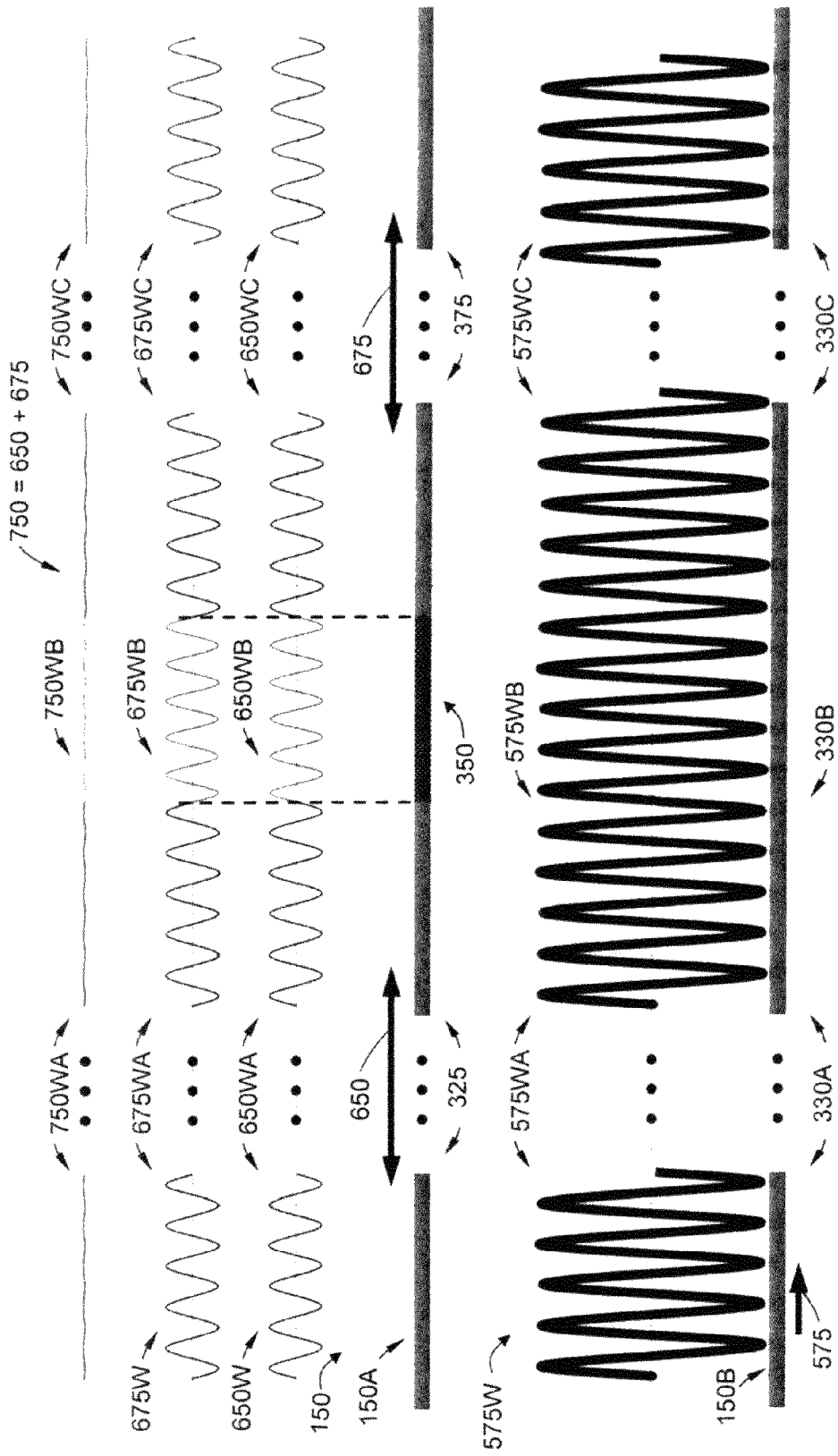
FIG. 7 is an illustration depicting an optical waveguide suppressing crosstalk via destructive interference, wherein the crosstalk has coupled onto the optical waveguide from another, adjacent optical waveguide in accordance with certain exemplary embodiments of the present invention.

For clarity of explanation, the following discussion of FIGS. 6 and 7 will largely focus on how the optical waveguides 150 suppress crosstalk imposed on the optical" waveguide 150A by the optical signal 575 transmitting on the optical waveguide 150B. With crosstalk on the optical waveguide 150A suppressed, the optical waveguide 150A can beneficially carry the optical signal 525 or any other appropriate optical signal or light energy. Moreover, each optical waveguide 150A, 150B has a capability for suppressing crosstalk imposed by the other optical waveguide 150A, 150B.

Referring to FIG. 6, the optical signal 575 propagates over the waveguide 150B as illustrated in FIG. 7 and as discussed above. As the optical signal 575 propagates on the optical waveguide 150B adjacent the section 325 of the optical waveguide 150A, the energy transfer 625A produces the crosstalk 650 on the section 325 of the optical waveguide 150A. In certain exemplary embodiments, the coupled crosstalk 650 propagates forward and backwards on the optical waveguide 150A. In certain other exemplary embodiments, the coupled crosstalk 650 propagates only (or mostly) towards the phase shifter 350 and the section 375 of the optical waveguide 150A.

As the optical signal 575 propagates on the optical waveguide 150B adjacent the section 375 of the optical waveguide 150A, the energy transfer 625B produces the crosstalk 675 on the section 375 of the optical waveguide 150A. In certain exemplary embodiments, the coupled crosstalk 675 propagates forward and backwards on the optical waveguide 150A. In certain other exemplary embodiments, the coupled crosstalk 675 propagates only (or mostly) away from the phase shifter 350 and the section 325 of the optical waveguide 150A.

Turning now to FIG. 7, this figure illustrates an exemplary optical waveguide 150A suppressing crosstalk 650, 675 via destructive interference, wherein the crosstalk 650, 675 has coupled onto the optical waveguide 150A from another, adjacent optical waveguide 150B according to certain embodiments of the present invention. In an exemplary embodiment, FIG. 7 illustrates further details about the example illustrated in FIG. 6, and will be discussed in that context. FIG. 7, like the other figures illustrates simulated waveforms describing exemplary principles of operation of certain embodiments.

As will be discussed in further detail below, FIG. 7 can be viewed as describing operation of the optical waveguides 150 in an exemplary steady state condition. Alternatively and also as discussed below, FIG. 7 can be viewed as illustrating one or more time slices of an operation of the optical waveguide 150 that comprises a train of communication pulses flowing on the optical waveguide 150B.

FIG. 7 will be discussed largely from the perspective of suppressing crosstalk 650, 675 that has coupled onto the optical waveguide 150A as a result of the optical signal 575 propagating on the optical waveguide 150B. However, the optical waveguides 150 can likewise suppress crosstalk coupled onto the optical waveguide 150B via the optical signal 525 (see FIG. 5) transmitting on the optical waveguide 150A. Thus, an exemplary embodiment of the system of the optical waveguides 150 can suppress crosstalk on either or both of the optical waveguides 150A and 150B.

As the optical signal 575 propagates on the section 330A of the optical waveguide 150B, the crosstalk 650 couples onto the section 325 of the optical waveguide 150A. FIG. 7 illustrates an exemplary embodiment of that coupled crosstalk 650 as the waveform 650W, which propagates along the optical waveguide 150A. The waveform 650W includes the waveform 650WA on the section 325 of the optical waveguide 150A, the waveform 650WB on the section 350 of the optical waveguide 150A, and the waveform 650WC on the section 375 of the optical waveguide 150A. The waveform 650WA and 650WC are shifted approximately 180 degrees (it radians or one-half of a cycle) with respect to one another as a result of the phase shifter 350. The waveform 650WB comprises a transition between the waveforms 650WA and 650WC.

While the optical signal 575 travels along the optical waveguide 150B, the crosstalk 650 likewise travels along the optical waveguide 150A. Thus, the waveform 650W of the crosstalk 650 propagates over the optical waveguide 150A while the waveform 575W of the optical signal 575 propagates over the optical waveguide 150B. The optical signal 575 and its associated waveform 575W move onto the section 330C of the optical waveguide 150B. The optical signal 575 propagating on the section 330C of the optical waveguide 150B induces the crosstalk 675 onto the section 375 of the optical waveguide 150A.

In the illustrated embodiment, the crosstalk 675 has an electromagnetic form exemplified by the illustrated waveform 675W. On the section 375 of the optical waveguide 150A, the waveform 675WC of the crosstalk 675 is approximately 180 degrees or about one-half cycle out of phase with respect to the waveform 650WC of the crosstalk 650. That is, the peaks or maximum parts of the waveform 675WC generally lineup with the troughs or minimum parts of the waveform 650WC, and the troughs or minimum parts of the waveform 675WC generally lineup with the peaks or maximum parts of the waveform 650WC. With this phase relationship, the waveform 675WC and the waveform 650WC interact with one another, resulting in destructive interference. Thus, the crosstalk 675 and the crosstalk 650 cancel one another on the section 375 of the optical waveguide 150A. With the crosstalk 675, 650 so managed, the optical waveguide 150A can conduct other optical signals, and such optical signals can be better received.

In certain exemplary embodiments, the optical signal 575 is a pulse, representing a bit of data for example. Such a pulse can be short enough (in time and/or length) such that when the pulse reaches the section 330C of the optical waveguide 150B (and couples the crosstalk 675 onto the section 375 of the optical waveguide 150A), the pulse is no longer inducing crosstalk on the section 325 of the optical waveguide 150A. For example, the optical signal 575 might be a short-duration pulse that is 5 millimeters in length, while the sections 325, 330A, 375, and 330C are each about 100 millimeters in length. The pulse, propagating on the section 330A of the optical waveguide 150B, induces the crosstalk 650 onto the section 325 of the optical waveguide 150A. That induced crosstalk 650, which could be characterized as a crosstalk pulse, travels to the section 375 of the optical waveguide 150A. By the time the crosstalk pulse has moved fully onto the section 375 of the optical waveguide 150A, the crosstalk pulse has essentially exited the section 325 of the optical waveguide 150A. When the pulse reaches the section 330C of the optical waveguide 150B, energy couples onto the section 375 of the optical waveguide 150A in the form of a crosstalk pulse that is shifted in phase from the crosstalk pulse that originated on the section 325 of the optical waveguide 150A. The two crosstalk pulses cancel one another on the section 375 via destructive interference.

Alternatively, the optical signal 575 has a very long duration such that the optical signal 575 flows onto the optical waveguide 150B as an uninterrupted and continuous stream of light that is uniform (over a period of seconds or minutes for example). In this situation, the crosstalk 650 and the crosstalk 675 may each flow in both directions on the optical waveguide 150A. Destructive interference may occur not only on the section 375 of the optical waveguide 150A, but also on the section 325 and the section 350 (phase shifter 350) of the optical waveguide 150A.

In FIG. 7, the waveform 750WC illustrates an example of how some residual crosstalk can remain on the section 375 of the optical waveguide 150A. That residual crosstalk can flow towards the section 325 of the optical waveguide 150A, appearing as the waveforms 750WB and 750WA, for example. In certain exemplary the waveform 750WA represents residual crosstalk resulting from destructive interference occurring on the section 325 of the optical waveguide 150A. For example, destructive interference can occur on the section 325 between crosstalk 650 coupled directly onto the section 325 and crosstalk that has coupled onto some other section of the optical waveguide 150A and then flowed onto the section 325. Similarly, the waveform 750WB can represent residual crosstalk resulting from destructive interference occurring on the section 350 (phase shifter 350).

In certain exemplary embodiments, the phase shifter 350 (section 350) extends substantially from one end to the other of the optical waveguide 150A. Thus, the sections 325 and 375 can be short or even nonexistent. In this case, effective crosstalk suppression can occur on the phase shifter 350 (section 350) of the optical waveguide 150A and on the corresponding section 330B of the optical waveguide 150B. The phase shifter 350 (section 350) can have a refractive index profile that facilitates crosstalk cancellation via destructive interference. For example, the refractive index of the phase shifter 350 (section 350) can substantially equal the refractive index of the section 325 and/or the section 330A at the left-hand side (as illustrated), gradually increase to a peak in the approximate middle of the phase shifter 350 (section 350), and then gradually decrease to the right-hand side to substantially equal the refractive index of the section 375 and/or the section 330C. As discussed above, the profile can be Gaussian or have a bell shape.

In certain exemplary embodiments, the waveforms 675WB and 675WA are suppressed via destructive interference that occurs on section 375 as discussed above. In certain exemplary embodiments, the crosstalk 650 and the crosstalk 675 primarily propagate in the same direction (e.g. left to right in the illustration) as the optical signal 575 inducing the crosstalk 650, 675. Accordingly, the waveforms 675 WA and 675WB can have a reduced intensity. In certain exemplary embodiments, the waveforms 675WA and 675WB may have a substantial intensity (propagating right to left in the illustration) and still avoid obscuring optical signals transmitting on the optical waveguide 150A from left to right in the illustration. In many applications, residual crosstalk and optical signals may propagate in opposite directions on the same optical waveguide without compromising detection of those optical signals.

Figure 8:
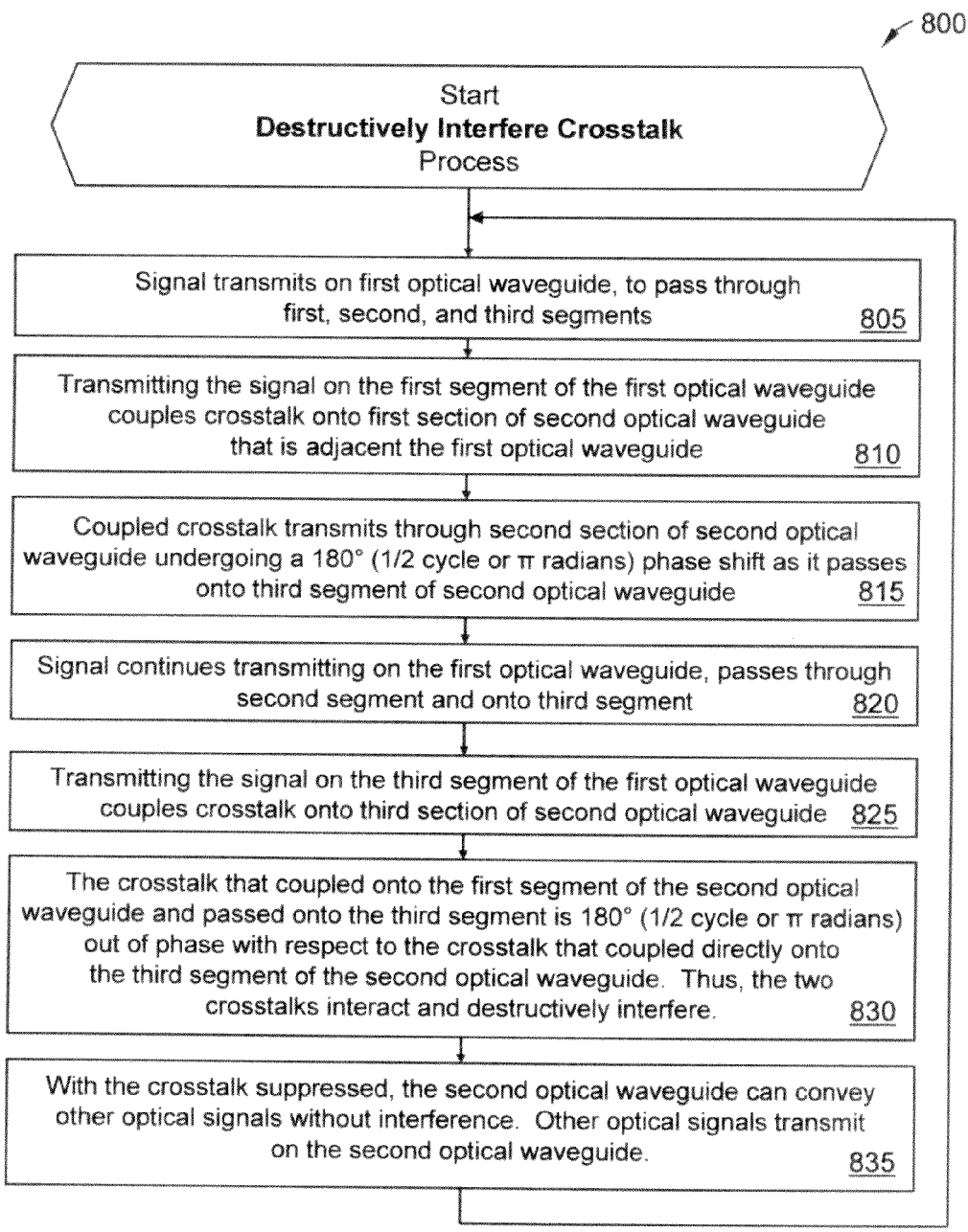
FIG. 8 is a flowchart of a process for suppressing crosstalk via destructive interference, wherein one optical waveguide has coupled the crosstalk onto another optical waveguide in accordance with certain exemplary embodiments of the present invention.

Turning now to FIG. 8, this figure illustrates a flowchart of an exemplary process 800 for suppressing crosstalk 650, 675 via destructive interference, wherein one optical waveguide 150B has coupled the crosstalk 650, 675 onto another optical waveguide 150A according to certain embodiments of the present invention. Exemplary steps of process 800 will now be discussed with reference to elements of FIGS. 1-7, as appropriate, and in accordance with the foregoing discussion of those figures.

Certain steps in process 800, as well as steps of other methods and processes disclosed herein, should naturally precede others for the technology to function as described. However, the present invention is not limited to the order of the steps described if such order or sequence does not adversely alter the functionality of the present invention to the extent of rendering it substantially inoperable. That is, it is recognized that some steps may be performed before or after other steps or in parallel with other steps without departing from the scope and spirit of the present invention.

At step 805 of process 800, which is entitled "Destructively Interfere Crosstalk," an optical signal 575 transmits on the optical waveguide 150B, in turn over the segments 330A, 330B, and 330C. In an exemplary embodiment, that optical signal 575 can be (or can comprise) a light wave as illustrated in FIGS. 1A, 5, 6, and 7 as discussed above.

At step 810, the optical signal 575 couples the crosstalk 650 onto the segment 325 of the optical waveguide 150A as the optical signal 575 transmits over the segment 330A of the optical waveguide 150B.

At step 815, the crosstalk 650, which coupled onto the optical waveguide 150A at step 810, transmits over or through the segment 350 (phase shifter 350) and onto the segment 375 of the optical waveguide 150A. Accordingly, the crosstalk 650 undergoes a phase shift of about 180 degrees or one-half of a cycle or $\pi$ radians.

At step 820, the optical signal 575 transmits from the segment 330A to the segment 330B and then to the segment 330C of the optical waveguide 150B. At step 825, the crosstalk 675 couples onto the segment 375 of the optical waveguide 150A as the optical signal 575 propagates on the segment 330C of the optical waveguide 150B.

At step 830, the crosstalk 650 and the crosstalk 675 interact, destructively interfere with one another, and thus suppress or substantially cancel one another. As discussed above, destructive interference can result from a phase difference of about 180 degrees or one-half cycle or $\pi$ radians.

In accordance with certain embodiments of the present invention, destructive interference can result from other phase combinations. For example, three crosstalks components having relative phase shifts of 0 degrees, 120 degrees, and 240 degrees (with respect to one another) can destructively interfere with one another. Six crosstalk components having respective phase shifts of 0 degrees, 60 degrees, 120, degrees, 180 degrees, 240 degrees, and 300 degrees can similarly suppress one another via mutual destructive interference. Accordingly, certain embodiments of the present invention can accommodate configurations involving multiple phase shifters and various corresponding phase differences.

At step 835, the crosstalk 650 and 675 is effectively managed, suppressed, or eliminated, thus clearing the way for the optical waveguide 150A to carry other optical signals or other luminous energy. Following step 835, process 800 loops back and iterates steps 805 through 835. Accordingly, destructive interference of crosstalk 650, 675 continues, and the optical waveguides 150 have an enhanced capability for conducting light without hindrance or obstruction and with impunity.

Certain exemplary embodiments of the present invention achieve crosstalk cancellation using only the energy of the optical signals flowing through the optical waveguides 150. In certain exemplary embodiments, crosstalk cancellation is effective without requiring gain, converting light into electricity, and/or contributing energy in connection with crosstalk cancellation. Accordingly, the optical waveguides 150 can suppress crosstalk passively.

Certain exemplary embodiments of the present invention suppress crosstalk via destructively interfering two or more crosstalk components that are all traveling in the same direction along an optical path during destructive interference. Certain exemplary embodiments achieve such destructive interference of crosstalk without reflecting light in connection with crosstalk suppression. Certain exemplary embodiments achieve crosstalk suppression without establishing a Bragg condition and without employing a Bragg grating; however, some embodiment may incorporate Bragg technology.

In certain exemplary embodiments, the phase shifter 350 transmits at least 90, 95, or 99 percent of incident light, or in a range thereof. In certain exemplary embodiments, the phase shifter 350 transmits at least 90, 95, or 99 percent of incident crosstalk, or in a range thereof. In certain exemplary embodiments, the phase shifter 350 avoids reflecting light and/or crosstalk.

Figure 9:
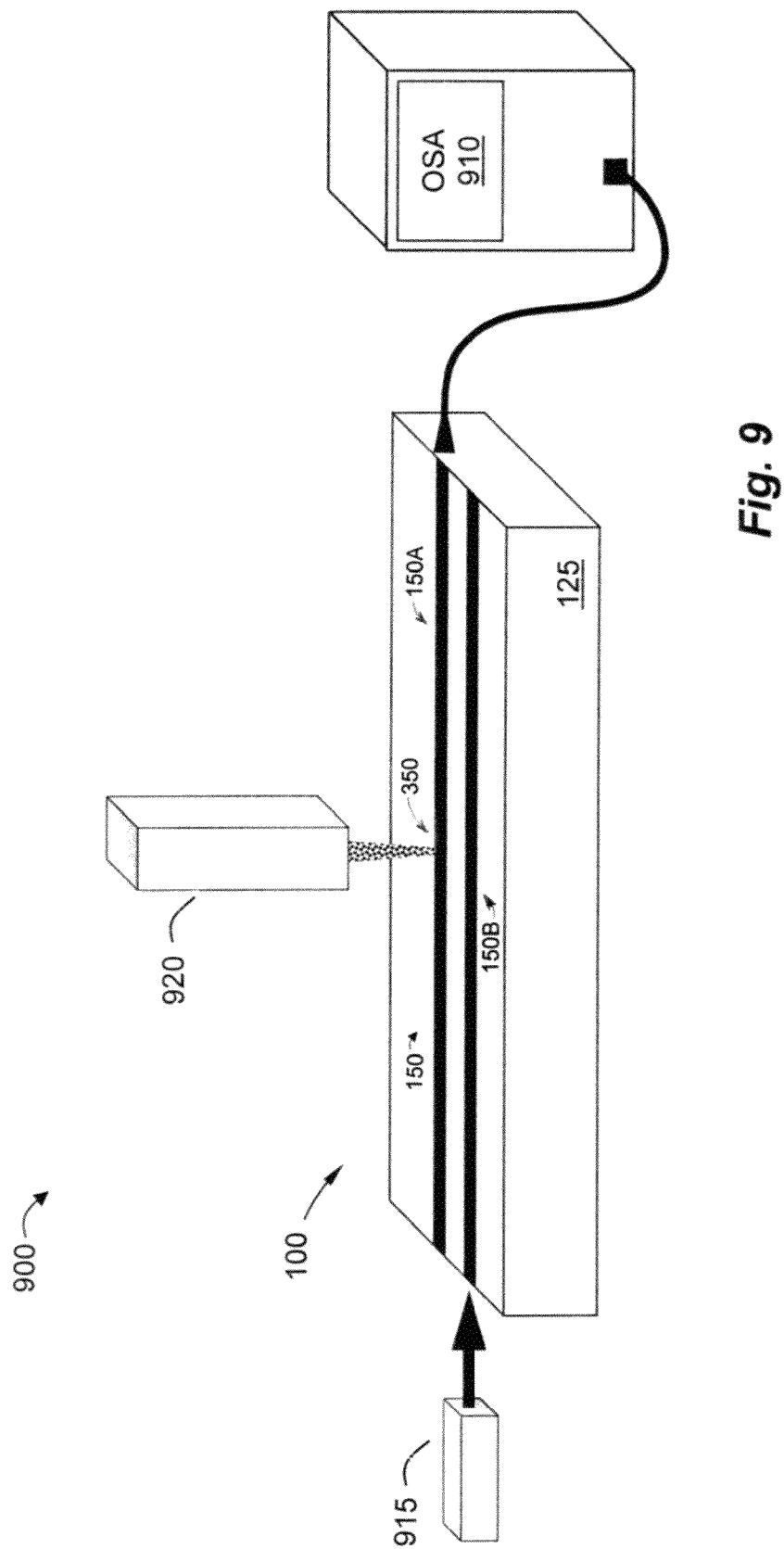
FIG. 9 is an illustration of a system for applying a phase shifting capability to an optical waveguide to isolate the optical waveguide from another, adjacent optical waveguide in accordance with certain exemplary embodiments of the present invention.
Figure 10:
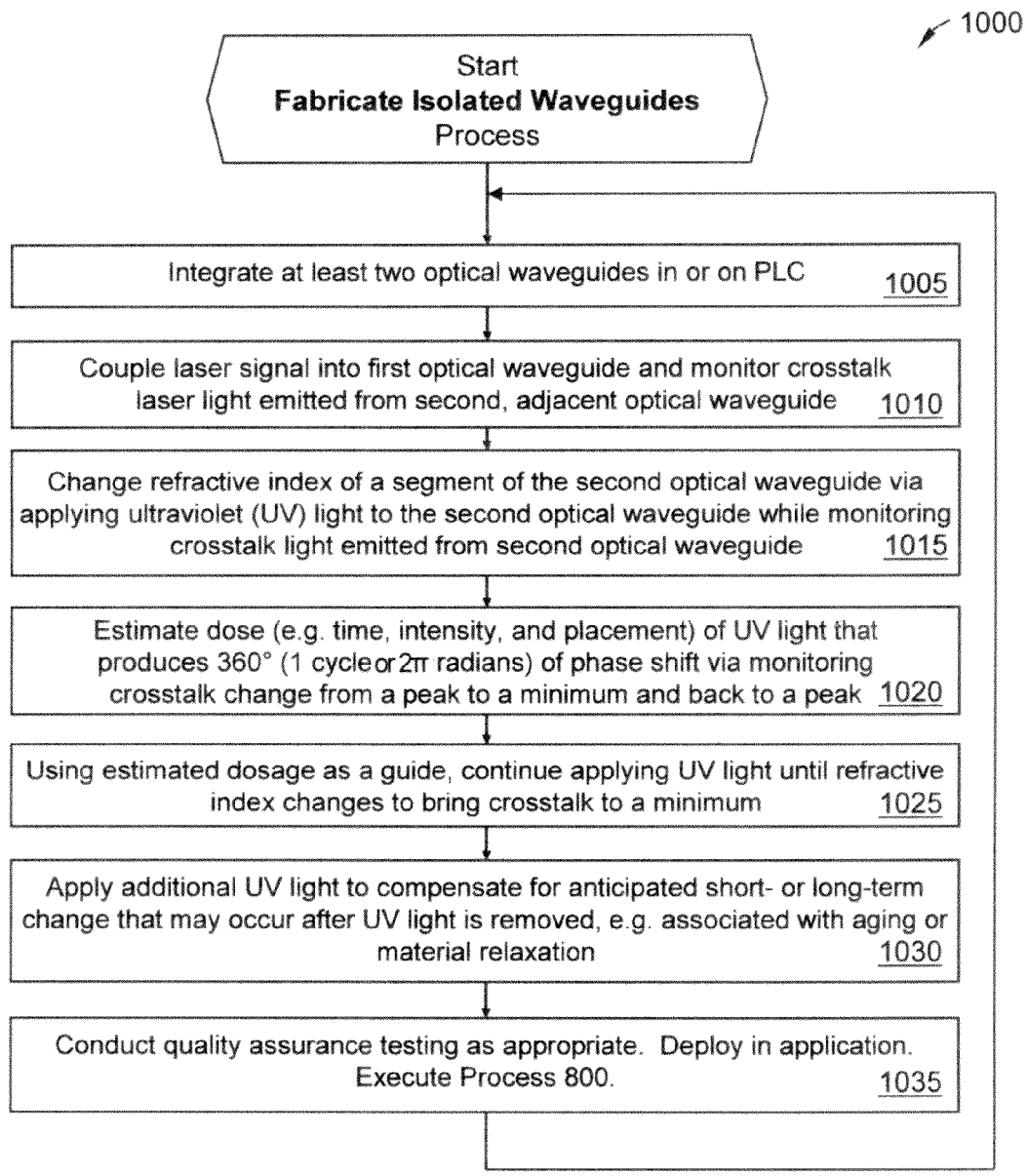
FIG. 10 is a flowchart of a process for making adjacent optical waveguides that are optically isolated from one another in accordance with certain exemplary embodiments of the present invention.

An exemplary system and process for fabricating the optical waveguides 150 with a capability for crosstalk cancellation will be discussed with reference to FIGS. 9 and 10. FIG. 9 illustrates an exemplary system 900 for applying a phase shifting capability to an optical waveguide 150A to isolate the optical waveguide 150A from another, adjacent optical waveguide 150B according to certain embodiments of the present invention. (The phase shifting capability applied to the optical waveguide 150A can further isolate the optical waveguide 150B from the optical waveguide 150A.) FIG. 10 illustrates a flowchart of an exemplary process 1000 for making adjacent optical waveguides 150 that are optically isolated from one another according to certain embodiments of the present invention.

At step 1005 of process 1000, which is entitled "Fabricate Isolated Waveguides," two or more optical waveguides 150 are integrated into or onto a PLC. In certain exemplary embodiments, the waveguides 150 are embedded in the substrate 125 via ion exchange as discussed above with reference to FIG. 2. In certain other exemplary embodiments, the waveguides 150 are created via silica-on-silicon fabrication or other appropriate fabrication technology known in the art.

At step 1010, the PLC and the integrated optical waveguides 150 are positioned at a station 900 of an manufacturing assembly line in preparation for integrating the phase shifter 350 with the optical waveguide 150A. A laser 915 outputs the optical signal 575 into the optical waveguide 150B. In certain exemplary embodiments, an optical fiber, disposed between the laser 915 and the optical waveguide 150B, launches the optical signal 575 into the optical waveguide 150B. Such an optical fiber can strip light modes that would not ordinarily be present when the optical waveguides 150 are deployed in an application environment, thereby emulating operation in a working application.

In certain exemplary embodiments, the optical signal 575 injected for testing purposes can be a constant or un-modulated signal. Alternatively, the optical signal 575 can be a modulated signal or a predetermined pattern of bits.

In certain exemplary embodiments, the optical signal 575 used for configuring the phase shifter 350 can have a wavelength that is not necessarily equal to a specific operating wavelength of the optical waveguides 150. In certain applications, such as DWDM optical communications, the optical waveguides 150 will each carry multiple channels of light having different wavelengths. By configuring the phase shifter 350 for a wavelength in the middle of the operating wavelength range (e.g. between at least two operating wavelengths), the optical waveguides 150 can suppress crosstalk across that range. Thus, the phase shifter 350 can be adapted for crosstalk suppression across a span of wavelengths or channels, without necessarily being optimized for any specific DWDM channel. Similarly, when one or both of the optical waveguides 150A, 150B carries bidirectional signals (e.g. in a duplex configuration), the optical signal 575 can be selected to be halfway between the wavelengths of the two communication signals that propagate in opposite directions for the purposes of process 1000.

An optical spectrum analyzer ("OSA") 910 monitors the output of the optical waveguide 150A while the laser 915 feeds the optical signal 575 into the optical waveguide 150B. As an alternative to the OSA 910, a detector, bit error rate tester ("BERT"), sensor, receiver, or other optical instrument can monitor the crosstalk 650, 675 output of the optical waveguide 150A. The optical signal 575 transmitting on the optical waveguide 150B induces crosstalk 650, 675 on the optical waveguide 150A, and the OSA 910 monitors the intensity (and thereby the suppression) of the induced crosstalk 650, 675.

In certain exemplary embodiments, the crosstalk 650, 675 is the only light transmitting over the optical waveguide 150A during testing. Alternatively, another optical signal, such as a predefined or random bit pattern, transmits over the optical waveguide 150A while the crosstalk 650, 675 is coupled onto the optical waveguide 150A. In this, case a BERT or an instrument that captures an eye diagram can evaluate the quality of the signal output by the optical waveguide 150A.

At step 1015, the laser 920 outputs ultraviolet ("UV") onto the optical waveguide 150A to alter the refractive index of a section 350 of the optical waveguide 150A, in order to create the phase shifter 350. In certain exemplary embodiments, the substrate 125 and the integrated optical waveguides 150 are placed in a high pressure hydrogen environment in preparation for applying the UV light. The hydrogen can permeate at least part of the substrate 125 and the optical waveguide 150A to increase the sensitivity of the optical waveguide 150A to the UV light, thereby promoting a change in refractive index to form the phase shifter 350.

During the application of UV light, the OSA 910 monitors the intensity of the crosstalk 650, 675 output by the optical waveguide 150A. The crosstalk 650,675 can either be monitored directly or via monitoring the degradation of a signal that is concurrently transmitting on the optical waveguide 150A, such as the random bit pattern discussed above with reference to step 1010.

At step 1020, an appropriate dosage of UV light is estimated. The dosage estimate can be determined via monitoring the amount of UV light energy that produces a complete cycle (360 degrees or $2\pi$ radians) of change in crosstalk 650, 675. That is, the crosstalk 650, 675 can increase to a positive peak or a maximum value, decrease to a negative peak or a minimum value, and then return to the positive peak or maximum value—in a cyclical, generally sinusoidal fashion. With knowledge of the quantity, intensity, and placement of UV light that produces a full cycle of change in coupled crosstalk 650, 675, an appropriate amount of UV light can be delivered to position the crosstalk cycle at its minimum value. Thus, the UV light can produce a refractive index profile that sets or configures the phase shifter 350 for destructive interference between the crosstalk 650 and the crosstalk 675. An additional quantity of UV light can be estimated for compensating for any relaxation in refractive index that may occur in a time period following UV light application.

At step 1025, UV light is applied to minimize (or substantially reduce) crosstalk 650, 675 based on dosage levels determined at step 1020. (In certain exemplary embodiments, steps 1020 and 1025 can be combined, or executed concurrently.)

At step 1030, an additional dosage of UV light can be applied to compensate for aging effects and/or material relaxation as discussed above.

At step 1035, the waveguides 150 can be subjected to quality control or quality assurance, as appropriate. Electronic, optoelectronic, and other components can be integrated to produce the system 100 illustrated in FIG. 1B and discussed above. The system 100 is deployed in an application as discussed above. Process 800 is executed as appropriate. Following step 1035, process 1000 can loop back to step 1005 and iterate, thus fabricating and deploying additional optically isolated optical waveguides.

Figure 11:
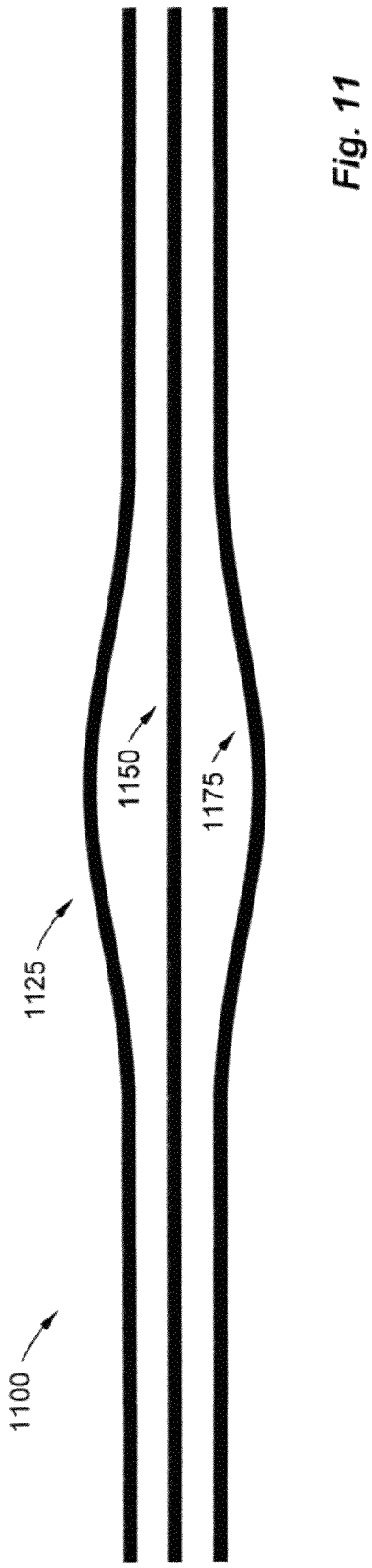
FIG. 11 is an illustration of adjacent optical waveguides that are optically isolated from one another in accordance with certain exemplary embodiments of the present invention.

Turning now to FIG. 11, this figure illustrates exemplary adjacent optical waveguides 1100 that are optically isolated from one another according to certain embodiments of the present invention. In the illustrated embodiment, the waveguide bends 1125, 1175 delay the light transmitting thereon to provide a phase shift relative to the light transmitting through the adjacent straight waveguide section 1150. The resulting phase shift can produce destructive interference that suppresses crosstalk as discussed above. Accordingly, in the illustrated system of optical waveguides 1100, the waveguide bends 1125, 1175 provide an exemplary embodiment of a phase shifter for suppressing crosstalk and improving waveguide isolation. In various embodiments, the optical waveguides 1100 can comprise bends, curls, curves, wrinkles, folds, ripples, or kinks for suppressing crosstalk via destructive interference. In an exemplary embodiment, each of the optical waveguides 1100 is constructed of like materials and has like optical characteristics (other than the illustrated bends 1125, 1175).

Although three waveguides 1100 are illustrated, the illustrated configuration can be extended to various array sizes, such as 5 waveguides, 10 waveguides, 15 waveguides, 20 waveguides, 25 waveguides, etc. disposed in proximity to one another. In such an array, every other optical waveguide can have a bend 1125, 1175. That is, each optical waveguide having a bend 1125, 1175 (other than the most lateral ones) can be disposed between two waveguides that each has a straight waveguide section 1150. And, each optical waveguide with a straight waveguide section 1150 (other than the most lateral ones) can be disposed between two optical waveguides that each has a waveguide bend 1125, 1175.

In one exemplary embodiment, all three optical waveguides 1100 are straight. In other words, all three of the optical waveguides 1100 have the straight waveguide section 1150 rather than a bend 1125, 1175. Thus, three optical waveguide 1100 can be parallel to one another, adjacent one another, substantially identical to one another, and prone to crosstalk transfer. In this example, a "micro-ring resonator" or a "ring resonator" can provide a phase shift in support of crosstalk suppression. Such a ring resonator can be disposed adjacent each of the outermost optical waveguides 1100. In other words, one ring resonator is disposed above (in the illustrated view) the optical waveguides 1100, and one resonator is disposed below (in the illustrated view) the optical waveguides 1100. Each resonator can delay light propagation on its adjacent optical waveguide to implement a phase shift. Thus, one ring resonator can replace the bend 1125, and one ring resonator can replace the bend 1175.

Figure 12:
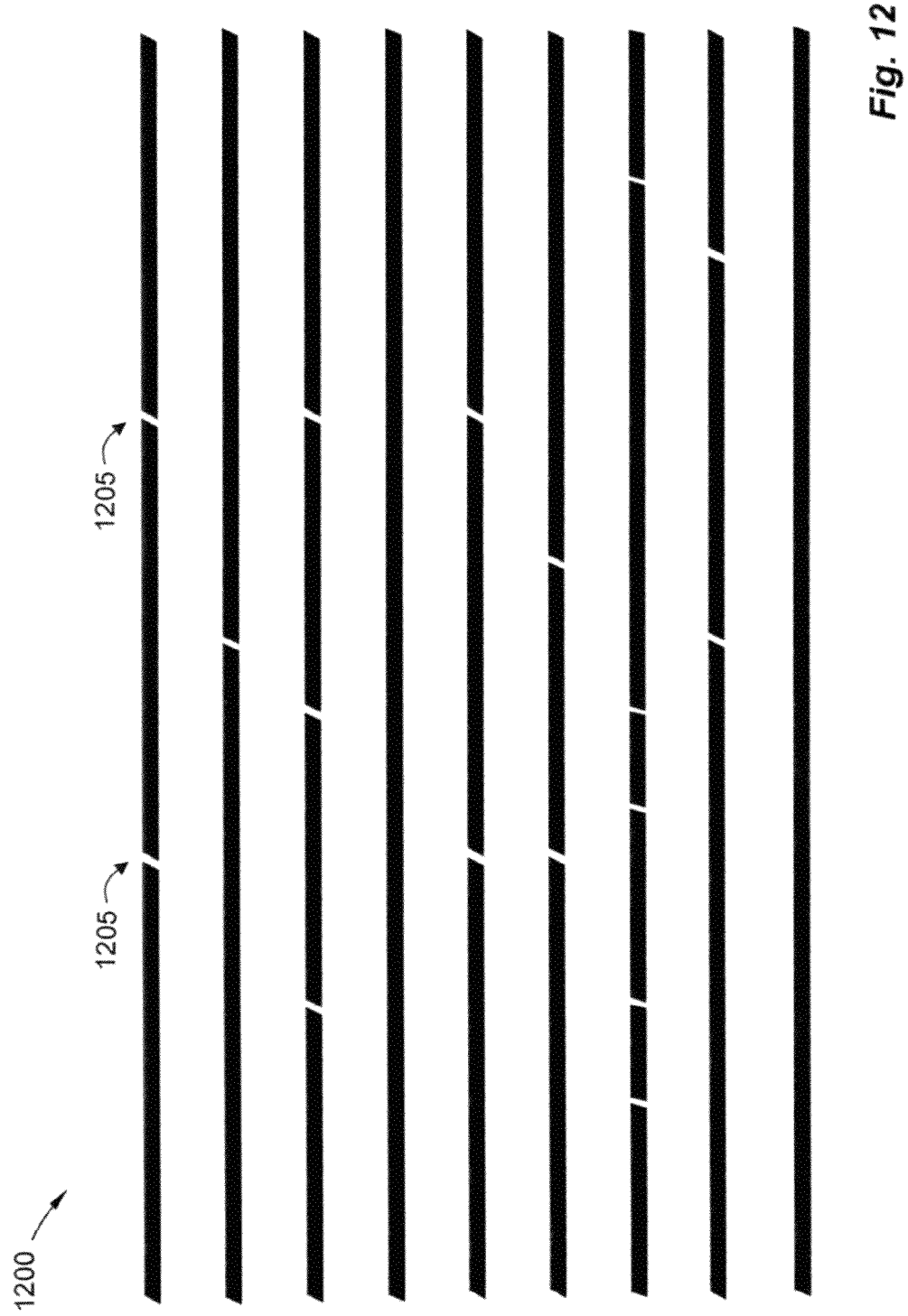
FIG. 12 is an illustration of an array of optical waveguides that are optically isolated from one another in accordance with certain exemplary embodiments of the present invention.

Turning now to FIG. 12, this figure illustrates an exemplary array of optical waveguides 1200 that are optically isolated from one another according to certain embodiments of the present invention. The optical waveguide 1200 comprises gaps 1205 providing exemplary phase shifters for suppressing crosstalk. With the gaps 1205 filled with air or another gas having similar optical properties, light propagates at a higher speed in the gaps 1205 than in the optical waveguides 1200. Accordingly, the gaps 1205 can provide a phase shift relative to the phase of light propagating on a longitudinally adjacent section of optical waveguide. Alternatively, filling the gaps with a material having a higher refractive index than the optical waveguides 1200 can provide a retarded phase. As discussed above, appropriately applied positive or negative phase shift can suppress talk via destructive interference.

The gaps 1205, which can be formed via reactive ion etching or with a thin cutting or abrasive disk, can be disposed at various longitudinal locations. In certain exemplary embodiments, each of the optical waveguides 1200 comprises a different pattern of the gaps 1205. In certain exemplary embodiments, the gaps 1205 are disposed at random locations. Placing the gaps 1205 at different locations can produce a pattern of phase shifts that avoids buildup or accumulation of phase shift, for example as a result of a resonance or similar effect. Alternatively, every other one of the optical waveguides 1200 has a gap 1205 disposed about in the longitudinal center, while the other optical waveguides 1200 do not comprise such gaps 1205.

Figure 13:
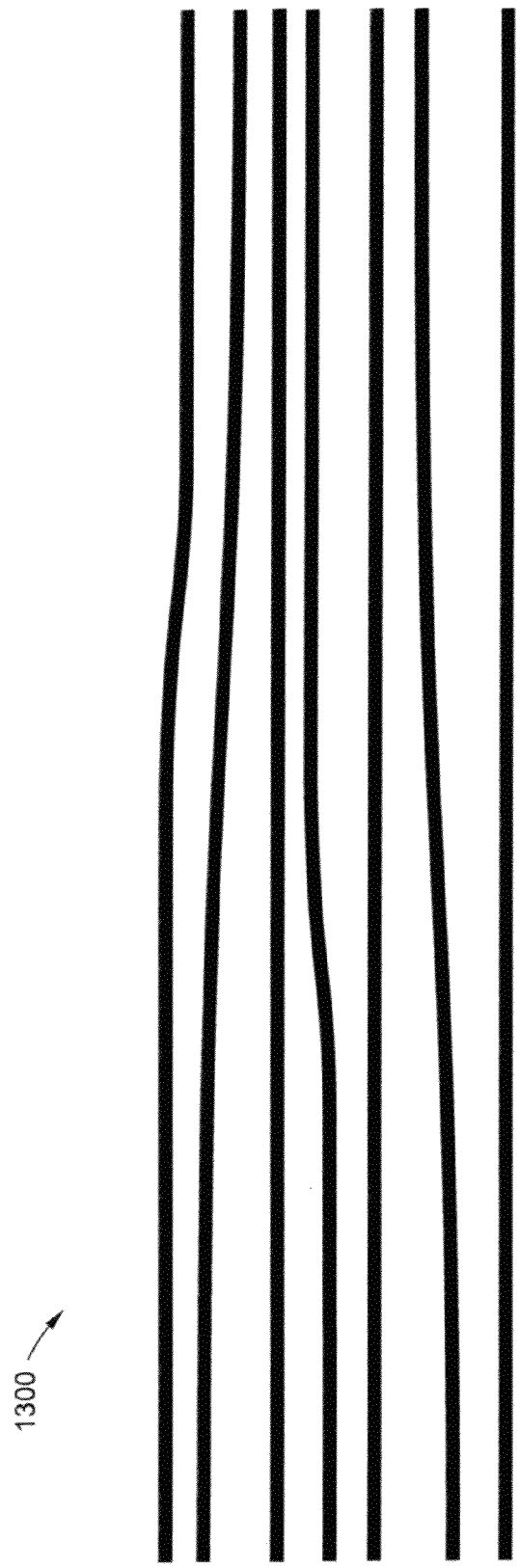
FIG. 13 is an illustration of an array of optical waveguides that are optically isolated from one another in accordance with certain exemplary embodiments of the present invention.

Turning now to FIG. 13, this figure illustrates an exemplary array of optical waveguides 1300 that are optically isolated from one another according to certain embodiments of the present invention. In the embodiment of FIG. 13, the optical waveguides 1300 are laid out in different patterns to help avoid crosstalk accumulation and/or to promote crosstalk suppression. Light on adjacent ones of the optical waveguides 1300 travels a different distance between ends of the array. Each of the optical waveguides 1300 is configured with bends and curves which produce corresponding delays, advances, and/or phase shifts of the light waves respectively transmitting thereon, thereby helping suppress, control, cancel, and/or manage crosstalk as discussed above. At various longitudinal locations of the array of waveguides 1300, the light on adjacent light paths has a phase difference that is increasing some times and decreasing other times. Having a phase difference that varies along adjacent optical waveguides can help avoid crosstalk accumulation.

Figure 14:
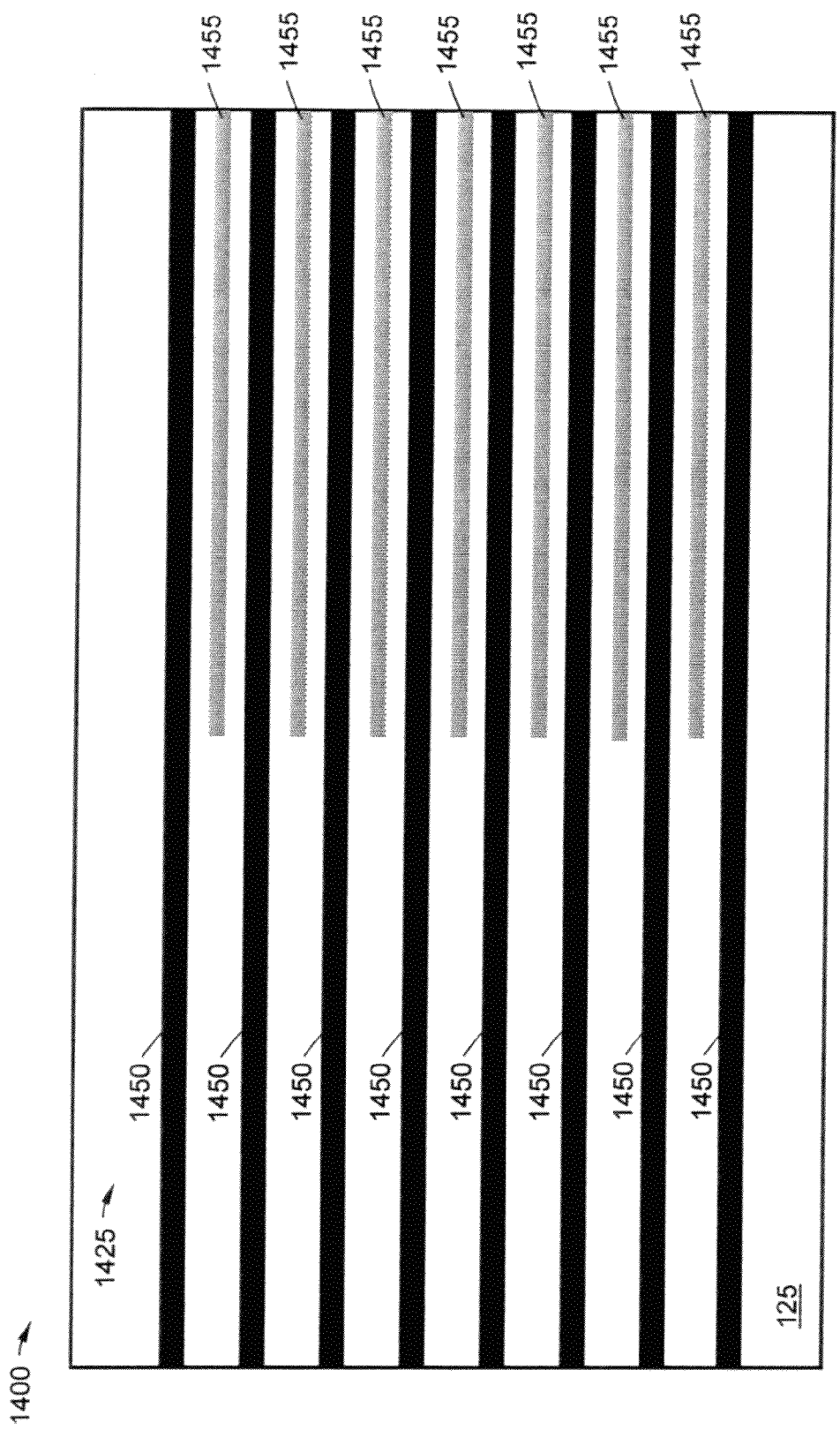
FIG. 14 is an illustration of an array of optical waveguides comprising a capability for phase shifting crosstalk as the crosstalk couples between adjacent optical waveguides to facilitate destructive interference of the coupled crosstalk and optical isolation of the optical waveguides from one another in accordance with certain exemplary embodiments of the present invention.

Turning now to FIG. 14, this figure illustrates an exemplary array 1425 of optical waveguides 1450 comprising a capability for phase shifting crosstalk as the crosstalk couples between adjacent optical waveguides 1450 to facilitate destructive interference of the coupled crosstalk and optical isolation of the optical waveguides 1450 from one another according to certain embodiments of the present invention. The array 1425 is exemplarily disposed on a substrate 125. The system 1400 that comprises the substrate 125, the array 1425, and the isolation capability can be a PLC or a PIC. The system can comprise additional components such as digital circuits, optoelectronic devices, lasers, analog electrical components, CPU cores, etc., as discussed above.

An exemplary phase shifter 1455 is disposed between each of the optical waveguides 1450. As illustrated, each phase shifter 1455 extends across about one-half of the total waveguide length, with this distance being exemplary rather than limiting. In other exemplary embodiments, the phase shifter 1455 may extend one-third, one-fourth, two-thirds, three-fourths, etc. And, in certain exemplary embodiments, multiple phase shifters 1455 are disposed between each of the optical waveguides 1450.

Further, in certain exemplary embodiments, the phase shifters 1455 fully extend so as to be substantially the same length as the optical waveguides 1450. Such a fully extending phase shifter can apply different levels of phase shift at different longitudinal locations in support of destructively interfering. In certain exemplary embodiments, the level of applied phase shift varies according to a Gaussian curve or a bell-shaped profile. In certain exemplary embodiments, the level of applied phase shift is sinusoidal, periodic, or cyclical, to provide a repeating pattern (with multiple cycles) across the substrate 125. Thus, the phase shifter 1455 can extend across the full substrate 125, and can provide different levels of crosstalk phase shift at different longitudinal locations.

As light propagates over each of the optical waveguides 1450, crosstalk is induced onto neighboring optical waveguides 1450. The crosstalk is induced via energy flowing through the materials in the space between those neighboring optical waveguides 1450. (See the energy transfer 625 illustrated in FIG. 6 and discussed above.) The phase shifter 1455 delays or impedes the energy transfer 625 at selected longitudinal locations between the optical waveguides 1450. As a result of this delay, the relative phase of the coupled crosstalk is different at different longitudinal locations in each of the optical waveguides 1450. In other words, delaying or advancing the luminous energy transferring between the optical waveguides 1450 (at different waveguide locations) results in coupled crosstalk of different phase. As discussed above, the crosstalk elements with different phases cancel one another via destructive interference.

Whereas the exemplary embodiment of FIG. 3 can produce crosstalk phase shift via implementing delay (or advance) on either the waveguide carrying the crosstalk or the waveguide that induces the crosstalk, the exemplary embodiment of FIG. 3 produces crosstalk phase shift via implementing delay (or advance) between the optical waveguides 1450. As discussed above, the crosstalk suppression approaches that are disclosed and taught herein can either be applied in combination or individually.

The phase shifters 1455 can be implemented by changing the optical properties of the material located between the optical waveguides 1450, for example via the process 1000 illustrated in FIG. 10 and discussed above. In this case, the UV light is directed between the optical waveguides 1450 rather than exclusively onto the optical waveguide cores. In other words, the UV light of process 1000 can be applied to a waveguide core, to a waveguide cladding, to a material located between optical waveguides 1450, or any combination thereof.

Alternatively, a strip of material, having a different dielectric constant and/or a different refractive index than the optical waveguides 1450 and the substrate 125, can be disposed between the optical waveguides 1450. Such as strip can be disposed in a groove between the optical waveguides 1450. In certain exemplary embodiments, such strips are disposed on or bonded to the surface of the substrate 125. Further, the strips can be located on top of a substrate 125 into which the optical waveguides 1450 are buried or embedded. In the example of silica waveguides, such strips can comprise silica doped with germanium or other appropriate material that varies the optical properties; the dielectric constant; and/or interaction with an electrical, magnetic, or electromagnetic field of light.

In one exemplary embodiment, the substrate 125 comprises (or is) crystalline silicon, with the waveguides 1450 on, at, in, or along the substrate top. A groove or channel having the cross sectional shape of a V (a "v-groove") can be etched between the optical waveguides 1450. The etching follows the crystal planes of the silicon to create a precise profile. One of ordinary skill in the art having the benefit of this disclosure can fabricate this structure without undue experimentation using photolithographic and etching processes readily available for making v-grooves in SiOBs. The v-groove can be filled at different places along its length with different materials to provide one or more of the phase shifters 1455. For example, optical epoxies (thermo-set or UV-set) or optical polymers (thermo-plastics that are meltable or settable plastics) can be disposed at different longitudinal locations within the v-groove. Such optical materials are available from various commercial sources. The v-groove can also be left void of such materials (that is filled with air or other gas only) at some longitudinal locations. In addition to providing a receptacle for phase shifting materials, the v-groove channel can block or divert the flow of light (e.g. scattered light) between the waveguides 1450, thereby providing an additional crosstalk reduction.

In certain exemplary embodiments, each phase shifter 1455 comprises physical features, such as a corrugation, an etching, a patterned surface, or some other feature that can affect, manipulate, or control energy transferring between two optical waveguides 1450. In certain exemplary embodiments, the phase shifters 1455 comprise a doped material or an embedded material. That is, the substrate 125 can comprise an intentionally added impurity, known as a "dopant," that changes the properties of the substrate 125 at photolithographically defined locations to form the phase shifter 1455. In various exemplary embodiments, such a dopant can comprise germanium, germanium dioxide, erbium, titanium, lithium, sodium, silver, or some other appropriate material.

In one exemplary embodiment, the optical waveguides 1450 are formed via ion exchange as discussed above. After forming the optical waveguides 1450, a photolithographically defined metallic mask is coated on the surface or the substrate 125. The mask has openings at the desired locations of the phase shifters 1455. A secondary ion exchange process exchanges ions of the substrate 125 for silver, lithium, or other suitable material. For example, a silver-sodium exchange can embed silver ions at selected locations in between the optical waveguides to form the phase shifters 1455.

In the case of fabricating phase shifters 1455 that span the entire length of the waveguides 1450, the mask can have an opening that varies along the substrate. For example, the mask opening can be small at each end of the substrate 125, transitioning to a peak width in the center. The mask opening can be alternatively be large at each end of the substrate 125 and gradually transitioning to a minimum width in the center. Alternatively, the mask opening can vary monotonically across the substrate 125, for example being large at one side and relatively small at the opposite side. The resulting embedded ions can have a concentration (or a distribution) that varies across the substrate 125 in accordance with the size of the mask opening. In certain exemplary embodiments, the ion concentration varies according to a bell shaped profile or a Gaussian curve. The resulting phase shifters can produce a phase shift that likewise varies. Accordingly, multiple fabrication embodiments have been disclosed, taught, and enabled for creating phase shifting elements that suppress optical crosstalk on light paths.

Technology for isolating optical paths has been described in detail so as to enable one of ordinary skill in the art to make and use the present invention without undue experimentation. From the description, it will be appreciated that an embodiment of the present invention overcomes limitations of the prior art. Those skilled in the art will appreciate that the present invention is not limited to any specifically discussed application or implementation and that the embodiments described herein are illustrative and not restrictive. From the description of the exemplary embodiments, equivalents of the elements shown herein will suggest themselves to those skilled in the art, and ways of constructing other embodiments of the present invention will appear to ordinary practitioners of the art. Therefore, the scope of the present invention is to be limited only by the accompanying claims.

What is claimed is:

1. A method for reducing crosstalk from a first optical waveguide onto a second optical waveguide proximate to the first optical waveguide, the method comprising:
    introducing a signal into the first optical waveguide;
    measuring the signal coupled from the first optical waveguide onto the second optical waveguide;
    selecting one of the first optical waveguide or the second optical waveguide; and
    modifying the selected waveguide at a predetermined location to produce a desired phase shift in the signal on the modified waveguide, the desired phase shift being based at least partially upon the measured signal, the desired phase shift causing signals coupled onto the second optical waveguide to at least partially destructively interfere.

2. The method of claim 1 wherein the desired phase shift is approximately 180 degrees.

3. The method of claim 1 wherein modifying comprises applying ultraviolet light to the selected waveguide at the predetermined location in an amount and duration sufficient to cause a phase shift which is approximately equal to the desired phase shift.

4. The method of claim 1 wherein modifying comprises introducing a dopant to the selected waveguide at the predetermined location in an amount sufficient to cause a phase shift which is approximately equal to the desired phase shift.

5. The method of claim 1 wherein the selected waveguide has a refractive index, and modifying comprises introducing a material to the selected waveguide at the predetermined location, the material having a different refractive index sufficient to cause a phase shift which is approximately equal to the desired phase shift.

6. A method for reducing crosstalk from a first optical waveguide onto a second optical waveguide proximate to the first optical waveguide, the method comprising:
    introducing a signal into the first optical waveguide;
    measuring the signal coupled from the first optical waveguide onto the second optical waveguide;
    selecting one of the first optical waveguide or the second optical waveguide;
    modifying the selected waveguide at a plurality of predetermined locations to produce respective desired phase shifts in the signal on the modified waveguide, the respective desired phase shifts being based at least partially upon the measured signal, the respective desired phase shifts causing signals coupled onto the second optical waveguide to at least partially destructively interfere.

7. The method of claim 6 wherein there are two predetermined locations and the respective desired phase shifts are approximately 120 degrees.

8. The method of claim 6 wherein there are five predetermined locations and the respective desired phase shifts are approximately 60 degrees.

9. The method of claim 6 wherein modifying comprises applying ultraviolet light to the selected waveguide at the predetermined locations in amounts and durations sufficient to cause respective phase shifts which are approximately equal to the respective desired phase shifts.

10. The method of claim 6 wherein modifying comprises introducing a dopant to the selected waveguide at the predetermined locations in amounts sufficient to cause respective phase shifts which are approximately equal to the respective desired phase shifts.

11. The method of claim 6 wherein the selected waveguide has a refractive index, and modifying comprises introducing a material to the selected waveguide at the predetermined locations, the material having a different refractive index sufficient to cause respective phase shifts which are approximately equal to the respective desired phase shifts.

12. An optical communication system, comprising:
    a first optical waveguide to transmit a first optical signal having a first wavelength and a phase, the first optical waveguide having a first portion and a second portion;
    a phase shifter, disposed between the first portion and the second portion of the first optical waveguide, to shift the phase of the first optical signal on the second portion by approximately 180 degrees with respect to the first optical signal on the first portion; and
    a second optical waveguide, proximate to the first optical waveguide, to transmit a second optical signal, wherein a portion of the first optical signal on the first portion is coupled onto the second optical waveguide, and wherein a portion of the first optical signal on the second portion is coupled onto the second optical waveguide.

13. The optical communication system of claim 12 wherein the phase shifter comprises a section of the first optical waveguide to which ultraviolet light has been applied in an amount and duration sufficient to cause a phase shift of approximately 180 degrees.

14. The optical communication system of claim 12 wherein the phase shifter comprises a section of the first optical waveguide to which a dopant has been applied in an amount sufficient to cause a phase shift of approximately 180 degrees.

15. The optical communication system of claim 12 wherein the first optical waveguide has a refractive index, and the phase shifter comprises a material having a different refractive index sufficient to cause a phase shift of approximately 180 degrees.

16. An optical communication system, comprising:
    a first optical waveguide to transmit a first optical signal having a first wavelength and a phase;
    a second optical waveguide, proximate to the first optical waveguide, to transmit a second optical signal, the second optical waveguide having a first portion and a second portion, wherein a portion of the first optical signal is coupled onto the first portion of the second optical waveguide, and wherein a portion of the first optical signal is coupled onto the second portion of the second optical waveguide; and
    a phase shifter, disposed between the first portion and the second portion of the second optical waveguide, to shift the phase of the coupled first optical signal on the second portion by approximately 180 degrees with respect to the coupled first optical signal on the first portion.

17. The optical communication system of claim 16 wherein the phase shifter comprises a section of the second optical waveguide to which ultraviolet light has been applied in an amount and duration sufficient to cause a phase shift of approximately 180 degrees.

18. The optical communication system of claim 16 wherein the phase shifter comprises a section of the second optical waveguide to which a dopant has been applied in an amount sufficient to cause a phase shift of approximately 180 degrees.

19. The optical communication system of claim 16 wherein the second optical waveguide has a refractive index, and the phase shifter comprises a material having a different refractive index sufficient to cause a phase shift of approximately 180 degrees.

20. An optical communication system, comprising:
   a first optical waveguide to transmit a first optical signal having a first wavelength and a phase;
   a second optical waveguide, proximate to the first optical waveguide, to transmit a second optical signal; and
   a plurality of phase shifters, disposed at predetermined locations along a predetermined one of the first optical waveguide or the second optical waveguide, each of phase shifters providing a desired phase shift, wherein signals coupled onto the other optical waveguide at least partially destructively interfere.

21. The optical communication system of claim 20 wherein at least one phase shifter comprises a section of the selected optical waveguide to which ultraviolet light has been applied in an amount and duration sufficient to cause the desired phase shift.

22. The optical communication system of claim 20 wherein at least one phase shifter comprises a section of the selected optical waveguide to which a dopant has been applied in an amount sufficient to cause the desired phase shift.

23. The optical communication system of claim 20 wherein the selected optical waveguide has a refractive index, and at least one phase shifter comprises a material having a different refractive index sufficient to cause the desired phase shift.

24. The optical communication system of claim 20 wherein there are two phase shifters and the desired phase shift is approximately 120 degrees.

25. The optical communication system of claim 20 wherein there are five phase shifters and the desired phase shift is approximately 60 degrees.

\* \* \* \* \*